United States Patent
Sugaya

(10) Patent No.: US 12,063,637 B2
(45) Date of Patent: Aug. 13, 2024

(54) COMMUNICATION APPARATUS AND COMMUNICATION METHOD

(71) Applicant: Sony Group Corporation, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 479 days.

(21) Appl. No.: 17/419,717

(22) PCT Filed: Jan. 31, 2020

(86) PCT No.: PCT/JP2020/003606
§ 371 (c)(1),
(2) Date: Jun. 30, 2021

(87) PCT Pub. No.: WO2020/166375
PCT Pub. Date: Aug. 20, 2020

(65) Prior Publication Data
US 2022/0086838 A1 Mar. 17, 2022

(30) Foreign Application Priority Data
Feb. 15, 2019 (JP) .................................. 2019-025707

(51) Int. Cl.
H04W 72/04 (2023.01)
H04W 72/0453 (2023.01)
H04W 72/54 (2023.01)

(52) U.S. Cl.
CPC ....... *H04W 72/0453* (2013.01); *H04W 72/54* (2023.01)

(58) Field of Classification Search
CPC .......................... H04W 72/0453; H04W 72/54
See application file for complete search history.

(56) References Cited

U.S. PATENT DOCUMENTS

| 9,991,996 | B2 | 6/2018 | Chu et al. |
| 10,966,280 | B1 * | 3/2021 | Chu ...................... H04L 1/1685 |
| 2008/0279126 | A1 * | 11/2008 | Katar .................... H04L 12/413 370/294 |

(Continued)

FOREIGN PATENT DOCUMENTS

| JP | 2009-509469 A | 3/2009 |
| JP | 2011-114377 A | 6/2011 |

(Continued)

OTHER PUBLICATIONS

International Search Report and Written Opinion mailed on Apr. 21, 2020, received for PCT Application PCT/JP2020/003606, Filed on Jan. 31, 2020, 12 pages including English Translation.

*Primary Examiner* — Michael J Moore, Jr.
(74) *Attorney, Agent, or Firm* — XSENSUS LLP

(57) ABSTRACT

The present technology relates to a communication apparatus and a communication method capable of realizing more reliable communication.
Provided is a communication apparatus including a control unit that performs control to use an available frequency channel to transmit a data frame to another communication apparatus, and add, to the data frame, available channel information regarding the frequency channel available for transmitting and receiving a frame. The present technology can be applied to, for example, a wireless LAN system.

5 Claims, 24 Drawing Sheets

(56) References Cited

U.S. PATENT DOCUMENTS

| | | | |
|---|---|---|---|
| 2011/0268200 A1* | 11/2011 | Yonge, III | H04L 25/0232 |
| | | | 375/259 |
| 2014/0307593 A1* | 10/2014 | Zhao | H04L 5/1469 |
| | | | 370/278 |
| 2016/0183062 A1* | 6/2016 | Logvinov | H04W 4/06 |
| | | | 370/312 |
| 2017/0208542 A1* | 7/2017 | Kim | H04W 84/12 |
| 2017/0294992 A1* | 10/2017 | Chu | H04L 27/2602 |
| 2020/0396043 A1* | 12/2020 | Wang | H04L 1/1607 |
| 2021/0153210 A1* | 5/2021 | Li | H04L 1/1614 |
| 2022/0086838 A1* | 3/2022 | Sugaya | H04L 1/1887 |

FOREIGN PATENT DOCUMENTS

| | | |
|---|---|---|
| JP | 2014-143715 A | 8/2014 |
| JP | 2017-500775 A | 1/2017 |
| JP | 2017-085554 A | 5/2017 |
| JP | 2017-536004 A | 11/2017 |
| TW | 201640856 A | 11/2016 |
| WO | 2010/067777 A1 | 6/2010 |
| WO | 2017/221186 A1 | 12/2017 |
| WO | 2018/009012 A1 | 1/2018 |
| WO | 2019/009099 A1 | 1/2019 |

* cited by examiner

FIG. 4
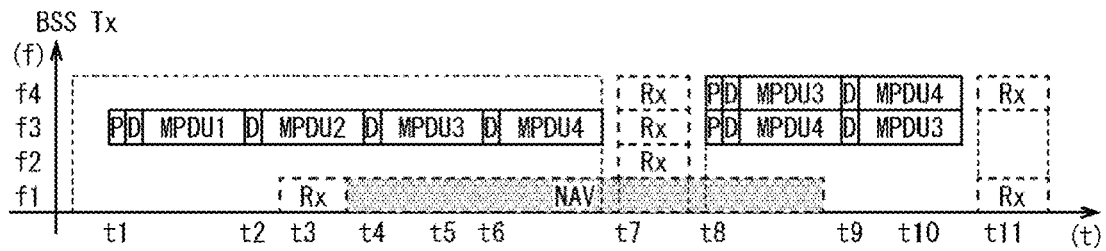
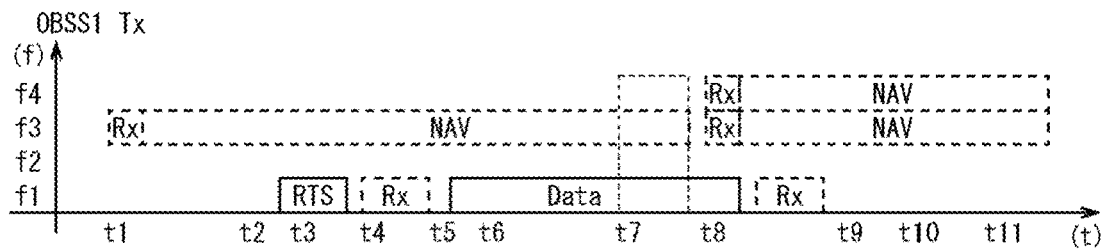
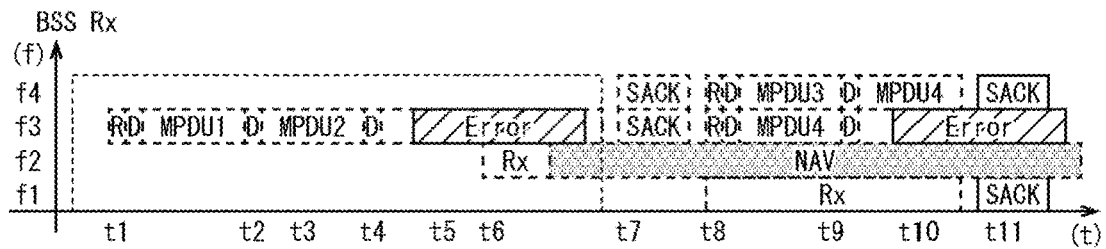
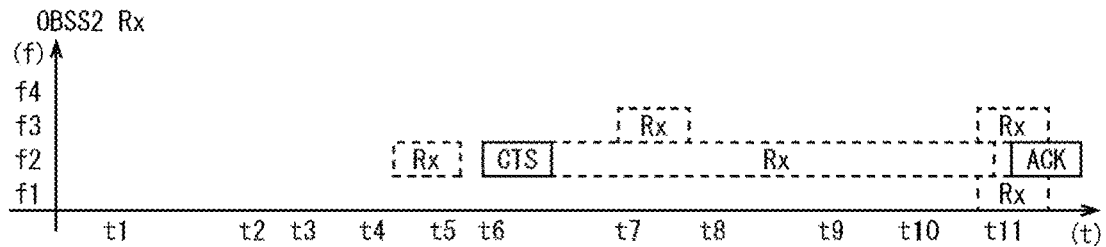
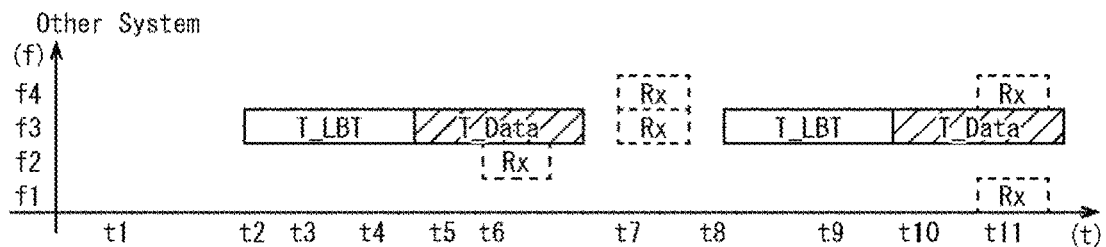

FIG. 7

| Frame Control | Duration | Address 1 | Address 2 | Address 3 | Sequence Control | Address 4 | QoS Control | HT Control | Start Ch. | Available Ch. Map |
|---|---|---|---|---|---|---|---|---|---|---|

MAC Header

FIG. 8

| Element Type | Length | Transmit Address | Receive Address | Start Ch. | Available Channel Map | BA Control | BA Information | Transfer Information | FCS |
|---|---|---|---|---|---|---|---|---|---|
| | | | | | Available Channel Map Information Element | | | | |

FIG. 10

| L-STF | L-LTF | L-SIG | RL-SIG | HE-SIG-A | HE-STF | HE-LTF | ... | HE-LTF | Channel Signal |
|---|---|---|---|---|---|---|---|---|---|

Preamble

*FIG. 11*

| Mid-amble |||||
|---|---|---|---|---|
| L-STF | L-LTF | L-SIG | HE-SIG-A | ... | Channel Signal |

FIG. 12

| Available Channel ACK Frame | | | | | | | |
|---|---|---|---|---|---|---|---|
| Frame Control | Duration | Transmit Address | Receive Address | BA Control | BA Information | Start Channel | Available Channel Map | FCS |

FIG. 13

| Available Channel Map | |
|---|---|
| Bit 0 | Channel 1 |
| Bit 1 | Channel 2 |
| Bit 2 | Channel 3 |
| Bit 3 | Channel 4 |
| Bit 4 | Channel 5 |
| Bit 5 | Channel 6 |
| Bit 6 | Channel 7 |
| Bit 7 | Channel 8 |

FIG. 14

| Available Channel Map | |
|---|---|
| Bit 0 | Lower Channel −3 |
| Bit 1 | Lower Channel −2 |
| Bit 2 | Lower Channel −1 |
| Bit 3 | Upper Channel +1 |
| Bit 4 | Upper Channel +2 |
| Bit 5 | Upper Channel +3 |

FIG. 15

| Available Channel Map | |
|---|---|
| Bit 0 | Base Channel |
| Bit 1 | Upper Channel +1 |
| Bit 2 | Lower Channel −1 |
| Bit 3 | Upper Channel +2 |
| Bit 4 | Lower Channel −2 |
| : | : |

FIG. 16

| Available Channel Map | |
|---|---|
| Bit 0 | Lower Channel −2 |
| Bit 1 | Lower Channel −1 |
| Bit 2 | Upper Channel +1 |
| Bit 3 | Upper Channel +2 |

FIG. 17

| Available Channel Map | |
|---|---|
| Bit 0 | Secondary Channel |
| Bit 1 | Secondary 40 Ch |
| Bit 2 | Secondary 80 Ch |
| Bit 3 | Secondary 160 Ch |

FIG. 19

| Available Channel Map | | | |
|---|---|---|---|
| 0 | 36 | 16 | 100 |
| 1 | 40 | 17 | 104 |
| 2 | 44 | 18 | 108 |
| 3 | 48 | 19 | 112 |
| 4 | 52 | 20 | 116 |
| 5 | 56 | 21 | 120 |
| 6 | 60 | 22 | 124 |
| 7 | 64 | 23 | 128 |
| 8 | 68 | 24 | 132 |
| 9 | 72 | 25 | 136 |
| 10 | 76 | 26 | 140 |
| 11 | 80 | 27 | 144 |
| 12 | 84 | 28 | 148 |
| 13 | 88 | 29 | 152 |
| 14 | 92 | 30 | 156 |
| 15 | 96 | 31 | 160 |

COMMUNICATION APPARATUS AND COMMUNICATION METHOD

CROSS-REFERENCE TO RELATED APPLICATIONS

The present application is based on PCT filing PCT/JP2020/003606, filed Jan. 31, 2020, which claims priority to JP 2019-025707, filed Feb. 15, 2019, the entire contents of each are incorporated herein by reference.

TECHNICAL FIELD

The present technology relates to a communication apparatus and a communication method, and more particularly to a communication apparatus and a communication method capable of realizing more reliable communication.

BACKGROUND ART

As a conventional data transmission method, a technology is used in which an acknowledgement (ACK) frame for confirmation of receipt is returned on the same frequency channel immediately after transmission of a data frame ends.

Furthermore, Patent Document 1 discloses a technology in which a null bit indicating whether or not an A-MPDU is null data is included in a delimiter. Moreover, Patent Document 2 discloses a technology in which an identifier including ACK instruction information of an MPDU is included in a delimiter field of the MPDU.

CITATION LIST

Patent Document

Patent Document 1: Japanese Patent Application Laid-Open No. 2014-143715
Patent Document 2: Japanese Patent Application National Publication (Laid-Open) No. 2017-536004

SUMMARY OF THE INVENTION

Problems to be Solved by the Invention

By the way, if an ACK frame is not returned correctly, the quality of communication deteriorates, for example, an error occurs in other communication or collision occurs with other communication. Therefore, a technology method for realizing more reliable communication has been desired.

The present technology has been made in view of such a situation, and is intended to realize more reliable communication.

Solutions to Problems

A communication apparatus of an aspect of the present technology is a communication apparatus including a control unit that performs control to use an available frequency channel to transmit a data frame to another communication apparatus, and add, to the data frame, available channel information regarding the frequency channel available for transmitting and receiving a frame.

A communication method of an aspect of the present technology is a communication method including, by a communication apparatus, performing control to use an available frequency channel to transmit a data frame to another communication apparatus, and add, to the data frame, available channel information regarding the frequency channel available for transmitting and receiving a frame.

In a communication apparatus and a communication method of an aspect of the present technology, control is performed to use an available frequency channel to transmit a data frame to another communication apparatus, and add, to the data frame, available channel information regarding the frequency channel available for transmitting and receiving a frame.

A communication apparatus of an aspect of the present technology is a communication apparatus including a control unit that performs control to use an available frequency channel to receive a data frame transmitted from another communication apparatus, specify a frequency channel available for transmitting and receiving a frame on the basis of available channel information included in the data frame, and use the frequency channel that is available and has been specified to transmit a confirmation signal used for confirmation of reception of the data frame to the another communication apparatus.

A communication method of an aspect of the present technology is a communication method including, by a communication apparatus, performing control to use an available frequency channel to receive a data frame transmitted from another communication apparatus, specify a frequency channel available for transmitting and receiving a frame on the basis of available channel information included in the data frame, and use the frequency channel that is available and has been specified to transmit a confirmation signal used for confirmation of reception of the data frame to the another communication apparatus.

In a communication apparatus and a communication method of an aspect of the present technology, control is performed to use an available frequency channel to receive a data frame transmitted from another communication apparatus, specify a frequency channel available for transmitting and receiving a frame on the basis of available channel information included in the data frame, and use the frequency channel that is available and has been specified to transmit a confirmation signal used for confirmation of reception of the data frame to the another communication apparatus.

Note that the communication apparatus of an aspect of the present technology may be an independent apparatus, or may be an internal block included in one apparatus.

BRIEF DESCRIPTION OF DRAWINGS

FIG. 4 is a diagram illustrating an operation flow of each communication apparatus in a case where a new method is applied.

FIG. 7 is a diagram illustrating an example of a MAC header configuration including available channel information.

FIG. 8 is a diagram illustrating an example of a configuration of an information element including available channel information.

FIG. 10 is a diagram illustrating an example of a preamble configuration including available channel information.

FIG. 11 is a diagram illustrating an example of a midamble configuration including available channel information.

FIG. 12 is a diagram illustrating an example of a configuration of a SACK frame.

FIG. 13 is a diagram illustrating a first example of parameters of available channel information.

FIG. 14 is a diagram illustrating a second example of parameters of available channel information.

FIG. 15 is a diagram illustrating a third example of parameters of available channel information.

FIG. 16 is a diagram illustrating a fourth example of parameters of available channel information.

FIG. 17 is a diagram illustrating a fifth example of parameters of available channel information.

FIG. 19 is a diagram illustrating a sixth example of parameters of available channel information.

MODE FOR CARRYING OUT THE INVENTION

Figure 1:
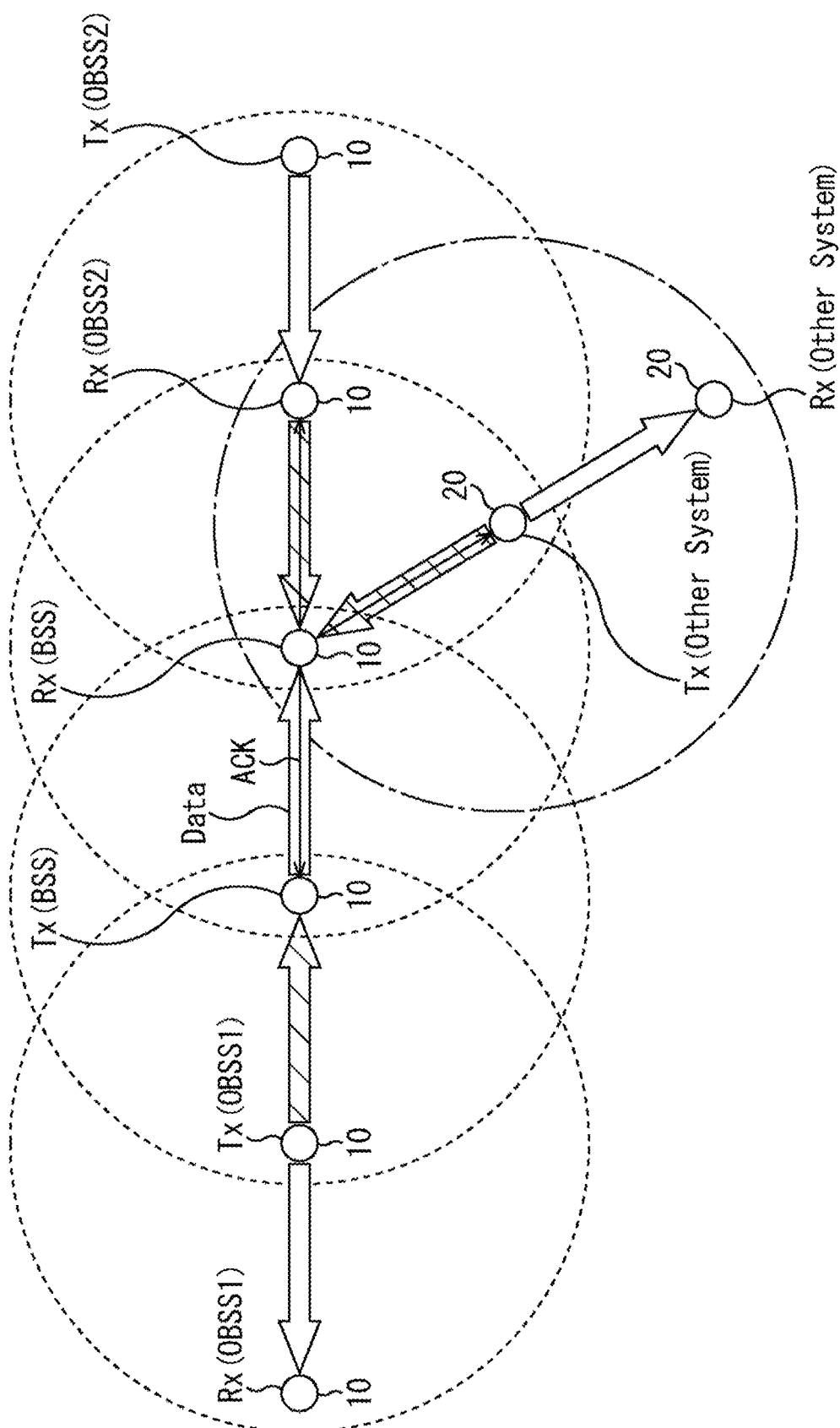
FIG. 1 is a diagram illustrating an example of a wireless network configuration.

Hereinafter, embodiments of the present technology will be described with reference to the drawings. Note that the description will be given in the following order.
1. Embodiment of present technology
2. Modification 1. Embodiment of Present Technology In a current data transmission method (current method), a technology is used in which an acknowledgement (ACK) frame for confirmation of receipt is returned on the same frequency channel immediately after transmission of a data frame ends.

Furthermore, in the current method, when setting a network allocation vector (NAV) using virtual carrier detection by exchanging a request to send (RTS) frame and a clear to send (CTS) frame, a data frame and an ACK frame are exchanged only on a channel on which the RTS frame and the CTS frame have been exchanged.

Moreover, in a wireless local area network (LAN) system, a technology in which a frame aggregation technology of aggregating and transmitting multiple data units (MAC protocol data units (MPDUs)) is applied to deliver a large amount of data with a single access control is used. Here, a method of returning a block ACK frame in order to confirm receipt of the data is put into practical use.

Here, in the current method, a method of transmitting a data frame on one frequency channel and then receiving an ACK frame on that frequency channel has been generally used.

Furthermore, in this frame aggregation technology, a technology is used in which a boundary signal called a delimiter is inserted to individually convey a data length of a subsequent data unit (MPDU).

For example, Patent Document 1 described above discloses a technology of including in a delimiter a null bit indicating whether or not a subsequent A-MPDU is null data.

Furthermore, for example, Patent Document 2 described above discloses a technology of including in an MPDU delimiter field an identifier including ACK instruction information of an MPDU.

By the way, as in the current method, in a case where a block ACK request is used to request the return of a block ACK frame immediately after the transmission of a data frame on one frequency channel ends, on that frequency channel, if a wireless transmission path is used also for reception by communication of another data frame (another communication), the return of the ACK frame may cause an error in communication of the another data frame.

It is easily assumed that, in a case where a communication apparatus receiving a data frame has an error in data as described above, data cannot be decoded correctly, and therefore, if an ACK frame is returned on the frequency channel in which the error occurs, the return collides with another communication.

Furthermore, in a case where the frame aggregation technology is applied, there is a problem that, if the subsequent block ACK frame is not returned correctly, all pieces of data are retransmitted again, and a wireless transmission path is occupied for a long time.

For example, in the configuration disclosed in Patent Document 1 described above, information regarding the MPDU in the A-MPDU frame is described in the delimiter, and there is a problem that, if this delimiter cannot be correctly decoded, the configuration of the next MPDU cannot be grasped.

Moreover, in the configuration disclosed in Patent Document 1, there is also a problem that information associated with the confirmation of receipt of the A-MPDU frame is not described in the delimiter, and the usage status other than the frequency channel cannot be transmitted.

Furthermore, for example, in the configuration disclosed in Patent Document 2 described above, the MPDU delimiter includes the ACK instruction information of the MPDU, and this ACK instruction information is unique ACK instruction information added to each MPDU in advance, and there is a problem that the information on the available channels cannot be sequentially updated and notified to the receiving side in the middle of the frame.

That is, there is a problem that the exchange of parameters required for confirmation of receipt cannot be changed during data transmission after receiving the A-MPDU frame, and the problem that the confirmation of receipt cannot be reliably returned due to changes in the channel status in use has not been solved.

In the present technology, proposed is a communication method (new method) to solve the above-mentioned problems and realize more reliable communication.

That is, in the communication method (new method) to which the present technology is applied, in a communication apparatus (for example, a base station) that is a data frame transmitting side, control is performed to use an available frequency channel to transmit a data frame (for example, an A-MPDU frame) to another communication apparatus (for example, a terminal station), and add available channel information (for example, an Available Channel Map) regarding the frequency channel that is available for transmitting and receiving the frame, to a data frame (for example, a delimiter of the A-MPDU frame or the like).

On the other hand, in a communication apparatus (for example, a terminal station) that is a data frame receiving side, control is performed to use an available frequency channel to receive a data frame (for example, an A-MPDU frame) transmitted from another communication apparatus (for example, a base station), specify a frequency channel available for transmitting and receiving a frame on the basis of available channel information (for example, an Available Channel Map) included in a data frame (for example, a delimiter of the A-MPDU frame or the like), and use the frequency channel that is available and has been specified to transmit a confirmation signal (for example, a SACK frame) used for confirmation of reception of the data frame, to another communication apparatus.

Note that, although details will be described later, a simulcast block ACK (SACK) frame corresponds to a frame in a case where a block ACK frame is transmitted by simulcast using a plurality of frequency channels (simulcast channels).

As described above, in the new method, proposed is a communication protocol in which information (available channel information) for specifying another frequency channel with which the communication apparatus on the transmitting side can exchange information is described in, for example, a delimiter of an A-MPDU frame or the like, and the communication apparatus on the receiving side is notified of the information, so that the communication apparatus on the receiving side selects a frequency channel that is available also on the receiving side on the basis of the available channel information, and returns a block ACK frame on a plurality of frequency channels.

That is, in the new method, proposed is a communication method in which a block ACK frame is transmitted on a free channel that is available by both the communication apparatus on the receiving side and the communication apparatus on the transmitting side, and the channel is used as a frequency channel used for subsequent data transmission.

Hereinafter, the details of the communication method (new method) to which the present technology is applied will be described with reference to the drawings.

(Example of Wireless Network Configuration)

FIG. 1 is a diagram illustrating an example of a wireless network configuration.

In FIG. 1, white circles (○) in the drawing indicate the existing position of each communication apparatus 10, and the outer broken line circle centered on the existing position indicates that it corresponds to a radio wave reachable range from each communication apparatus 10. Furthermore, the thick arrows in the drawing indicate the flow of data frames between the respective communication apparatuses 10, and the thin arrows in the drawing indicate ACK frames. Note that, in FIG. 1, there is a communication apparatus 20 in addition to the communication apparatus 10, and this is similar for the communication apparatus 20.

Here, in a wireless LAN network of a basic service set (BSS), communication is performed between a communication apparatus 10Tx (BSS) on a transmitting side and a communication apparatus 10Rx (BSS) on a receiving side.

In this situation, there are a communication apparatus 10Tx (OBSS1) on a transmitting side and a communication apparatus 10Rx (OBSS2) on a receiving side in each wireless LAN network of basic service sets (OBSS1, OBSS2) overlapping the periphery of the communication apparatus 10Tx (BSS) and the communication apparatus 10Rx (BSS), and moreover, there is a communication apparatus 20Tx (Other System) on a transmitting side of another system that is different from the wireless LAN system.

Note that other systems include, for example, wireless communication systems such as Long Term Evolution (LTE)/LTE-Advanced and 5th Generation (5G) formulated by Third Generation Partnership Project (3GPP).

At this time, in a case where a data frame is transmitted from the communication apparatus 10Tx (BSS) to the communication apparatus 10Rx (BSS) (arrow of "Data" in the drawing), a signal from the communication apparatus 10Tx (OBSS1) existing in the periphery of the communication apparatus 10Tx (BSS) causes an interference wave (hatched arrow in the drawing).

Furthermore, the communication apparatus 10Rx (BSS) returns an ACK frame for confirmation of reception after receiving a data frame from the communication apparatus 10Tx (BSS) (the arrow of "ACK" in the drawing), and a signal from the communication apparatus 10Rx (OBSS2) existing in the periphery of the communication apparatus 10Rx (BSS), and the communication apparatus 20Tx (Other System) causes an interference wave (hatched arrow in the drawing).

Furthermore, on the contrary, the ACK frame transmitted from the communication apparatus 10Rx (BSS) may be an interference source for the communication apparatus 10Rx (OBSS2) in the periphery of the communication apparatus 10Rx (BSS), and the communication apparatus 20Tx (Other System) (thin arrow inside the hatched arrow in the drawing).

(Current Data Retransmission Flow)

Here, the flow of data retransmission by the current method will be described with reference to FIGS. 2 and 3.

Figure 2:
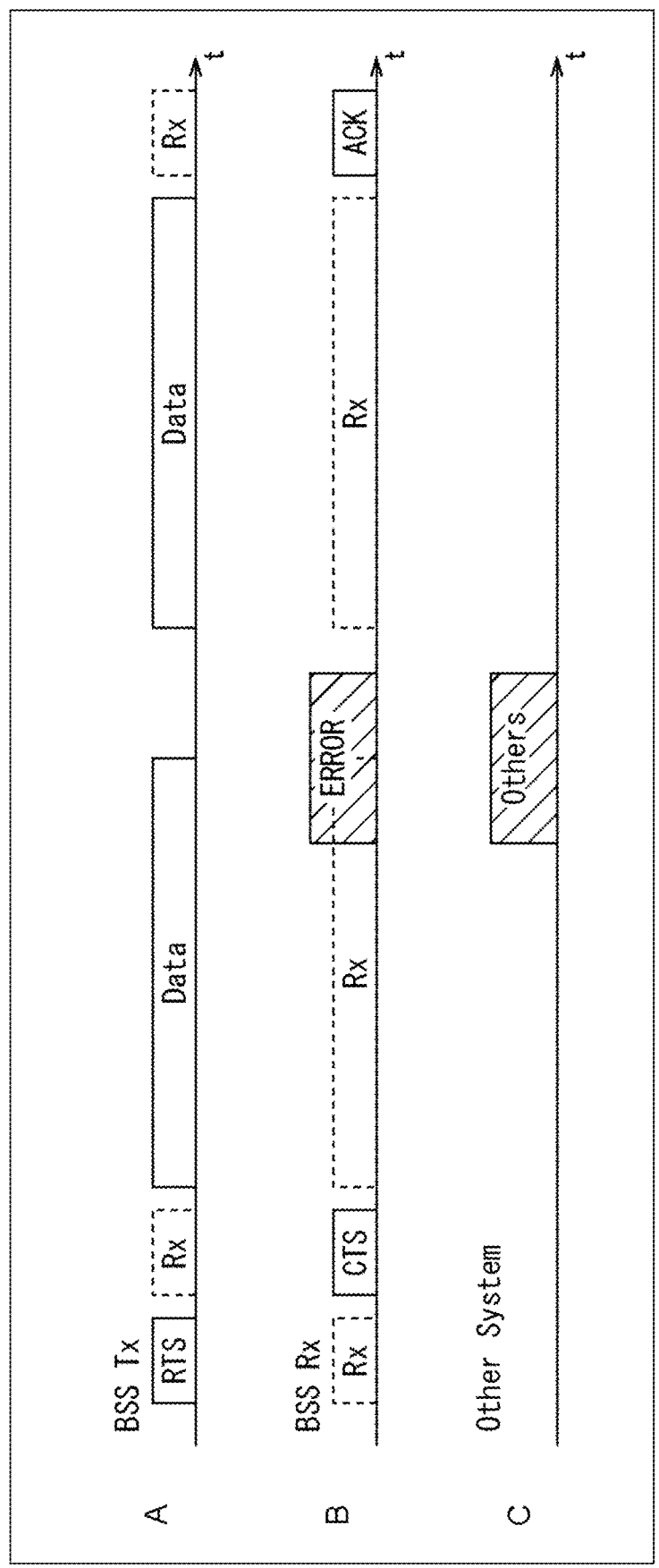
FIG. 2 is a diagram illustrating a flow of data retransmission by a current method.

FIG. 2 illustrates a case where, when the communication apparatus 10Tx (BSS) transmits a data frame and the communication apparatus 10Rx (BSS) receives the data frame, the communication apparatus 10Rx (BSS) cannot return (transmit) an ACK frame due to an interference wave from another system (communication apparatus 20Tx (Other System)).

That is, originally, in a case of a wireless LAN system, it is possible to set a virtual carrier sense by a network allocation vector (NAV) in advance so that a wireless transmission path is used by exchanging an RTS frame and a CTS frame, but in a case where there are other systems, since existence of an RTS frame and a CTS frame cannot be grasped, similar handling cannot be achieved.

FIG. 2 indicates that, in a case where there is a communication apparatus 20Tx of another system (Other System) the existence of the RTS frame and the CTS frame of which cannot be grasped, interference occurs due to the signal from the communication apparatus 20Tx of the another system, and by detection by the communication apparatus 10Rx (BSS), it is detected that the wireless radio transmission path is in use after the data transmission ends, and the ACK frame cannot be returned.

At this time, after the communication apparatus 10Tx (BSS) transmits the data frame, the communication apparatus 10Rx (BSS) does not return the ACK frame, so that the communication apparatus 10Tx (BSS) retransmits all the data frames. Therefore, in the communication apparatus 10Rx (BSS), there is a problem that the data of the part that has been normally received before being interfered by the another system is also retransmitted, and the data of the part that is unnecessary is retransmitted including the data of the part that has been originally received.

Figure 3:
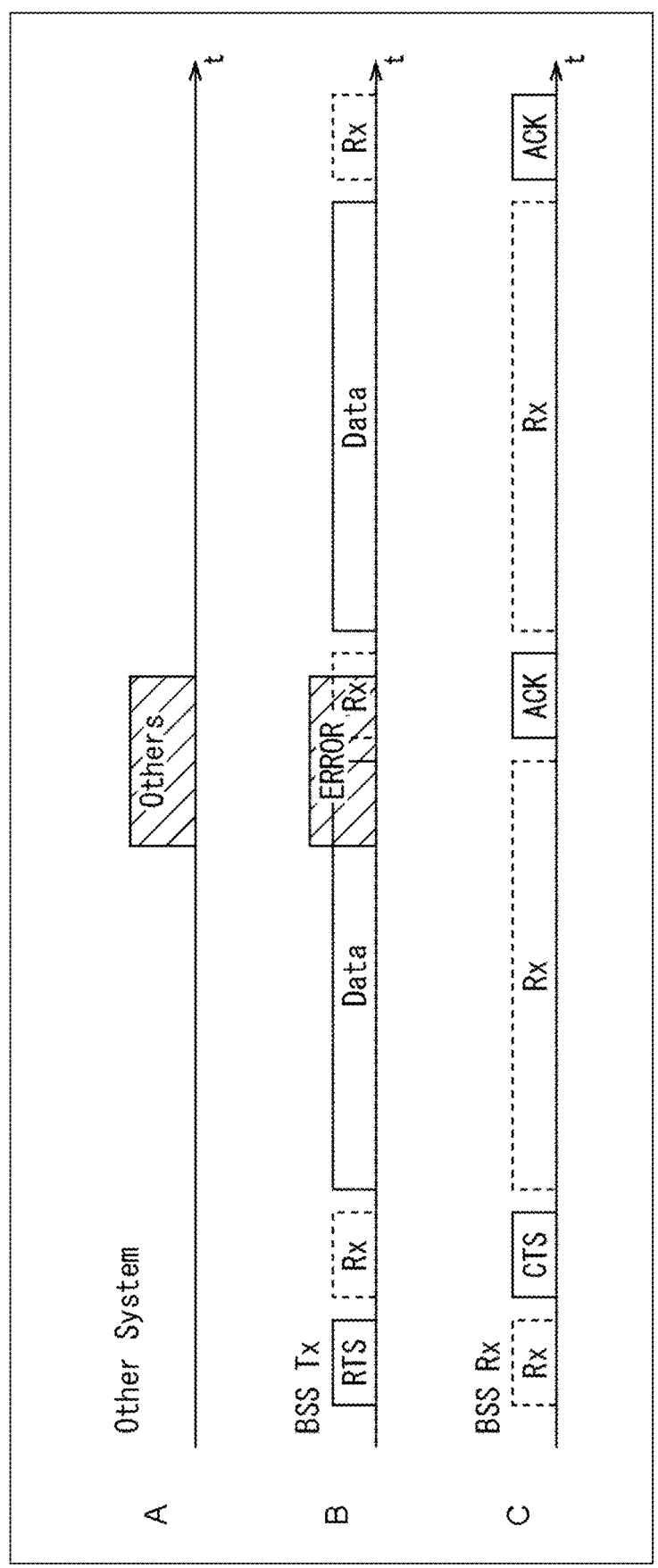
FIG. 3 is a diagram illustrating a flow of data retransmission by a current method.

Furthermore, FIG. 3 illustrates a case where, when the communication apparatus 10Tx (BSS) transmits a data frame and the communication apparatus 10Rx (BSS) receives the data frame, the communication apparatus 10Tx (BSS) cannot receive an ACK frame due to an interference wave from another system.

That is, as similar to the case of FIG. 2 described above, originally, in a case of a wireless LAN system, it is possible to set a virtual carrier sense by a network allocation vector (NAV), but in another system, since existence of an RTS frame and a CTS frame cannot be grasped, similar handling cannot be achieved.

FIG. 3 illustrates that the signal from the communication apparatus 20Tx of another system (Other System) interferes, and the communication apparatus 10Tx (BSS) cannot normally receive the ACK frame transmitted by the communication apparatus 10Rx (BSS).

At this time, after the communication apparatus 10Tx (BSS) transmits the data frame, the communication apparatus 10Rx (BSS) does not return the ACK frame, so that the communication apparatus 10Tx (BSS) retransmits all pieces of data. That is, also in the case of FIG. 3, as similar to the second case described above, the data of the part that has been normally received before being interfered by another system is retransmitted, and the data of unnecessary part is retransmitted.

The communication method (new method) to which the present technology is applied can provide a mechanism that can reliably transmit a data frame and return an ACK frame even in a crowded environment including another system as well as a wireless LAN system.

(Operation Flow of New Method)

FIG. 4 illustrates the operation flow of each communication apparatus 10 and the communication apparatus 20 in a case where the new method is applied.

In FIG. 4, since there is a plurality of frequency channels used for data transmission, for convenience of explanation, the vertical axis is the frequency channel (f) and the horizontal axis is the time (t), and state is illustrated where four frequencies from f1 to f4 are used for operation, and movements that change with time are each illustrated in parallel.

Note that FIG. 4 illustrates as an example a case where four frequency channels are used, but the present technology is not limited to this, and the number of frequency channels may be three or less or five or more.

A and B in FIG. 4, that is, the first stage and the second stage in the drawing illustrate the operation flow of the communication apparatus 10Tx (BSS) on the transmitting side and the operation of the communication apparatus 10Tx (OBSS1) on the transmitting side, respectively. Furthermore, C and D in FIG. 4, that is, the third stage and the fourth stage in the drawing illustrate the operation flow of the communication apparatus 10Rx (BSS) on the receiving side and the operation flow of the communication apparatus 10Rx (OBSS2) on the receiving side. Moreover, E in FIG. 4, that is, the fifth stage in the drawing illustrates the operation flow of the communication apparatus 20Tx (Other System) of another system.

Note that, in FIG. 4, each of the positions of the communication apparatus 10Tx (BSS), the communication apparatus 10Tx (OBSS1), the communication apparatus 10Rx (BSS), the communication apparatus 10Rx (OBSS2), and the communication apparatus 20Tx (Other System) corresponds to the positional relationship illustrated in FIG. 1. Furthermore, it is assumed that the data frame transmitted from the communication apparatus 10Tx (BSS) is an A-MPDU frame.

At time t1, the communication apparatus 10Tx (BSS) transmits an A-MPDU frame using the frequency channel f3 ("P D MPDU 1 . . . " of "f3" of A in FIG. 4). This A-MPDU frame is received (detected) by the communication apparatus 10Rx (BSS) and the communication apparatus 10Tx (OBSS1) ("Rx" of B, C in FIG. 4 corresponding to "P D MPDU 1 . . . " of "f3" of A in FIG. 4).

At this time, the communication apparatus 10Tx (OBSS1) sets a network allocation vector (NAV) of the frequency channel f3 over the duration described in a header of the received A-MPDU frame ("NAV" of B in FIG. 4). Furthermore, the communication apparatus 10Rx (BSS) is configured to receive an A-MPDU frame in a case where it is an A-MPDU frame addressed to the communication apparatus 10Rx (BSS).

Here, in the A-MPDU frame, an MPDU 1 is transmitted following a predetermined preamble (P) and a delimiter (D). The new method is characterized in that available channel information is described in the delimiter (D) inserted in the middle of the A-MPDU frame.

That is, the communication apparatus 10Tx (BSS) transmits the A-MPDU frame using the frequency channel f3 from time t1 to time t7, but the new method is configured such that the state of the wireless transmission path is monitored also in the frequency channels f1, f2, f4.

According to that, the communication apparatus 10Rx (BSS) also receives the A-MPDU frame using the frequency channel f3 from time t1 to time t7, but the new method is configured such that the state of the wireless transmission path is monitored also in the frequency channels f1, f2, f4.

Furthermore, at time t2, t4, t6 in the middle, the delimiter (D) of the A-MPDU frame is transmitted and received on the frequency channel f3, and the communication apparatus 10Tx (BSS) performs transmission including description of the delimiter (D), so that the communication apparatus 10Rx (BSS) can acquire the latest delimiter (D) information.

That is, the communication apparatus 10Tx (BSS) performs transmission including description in the delimiter (D) that the wireless transmission path is available in the frequency channels f1 to f4, so that the communication apparatus 10Rx (BSS) can grasp the available frequency channels from the information in the delimiter (D) that has been received.

Here, at time t3, the communication apparatus 10Tx (OBSS1) transmits an RTS frame using the frequency channel f1 ("RTS" of B in FIG. 4).

This RTS frame is received (detected) by the communication apparatus 10Tx (BSS) ("Rx" of A in FIG. 4 corresponding to "RTS" of B in FIG. 4). At this time, the communication apparatus 10Tx (BSS) sets a network allocation vector (NAV) of the frequency channel f1 over the duration described in the received RTS frame ("NAV" of A in FIG. 4).

Then, in the frequency channel f1, when the communication apparatus 10Tx (OBSS1) receives the CTS frame, the data frame is transmitted thereafter ("Rx", "Data" of B in FIG. 4), and therefore, the communication apparatus 10Tx (BSS) can receive the data, so that the frequency channel f1 is in the BUSY state for a period until the data transmission ends.

Moreover, at time t4, the communication apparatus 10Tx (BSS) sets the network allocation vector (NAV) to the frequency channel f1, in the delimiter (D) included in the A-MPDU frame transmitted using the frequency channel f3, and includes in the delimiter (D) description indicating that the frequency channel f1 is not available.

On the other hand, the communication apparatus 10Rx (BSS) receives the A-MPDU frame from the communication apparatus 10Tx (BSS) to acquire the delimiter (D) included in the A-MPDU frame, and thereby, the communication apparatus 10Rx (BSS) can grasp that the frequency channel f1 is not available in the communication apparatus 10Tx (BSS).

Moreover, at time t5, in a case where the communication apparatus 20Tx (Other System) transmits data using the frequency channel f3 ("T_Data" of E in FIG. 4), in the communication apparatus 10Rx (BSS), there is a problem that the data (signal) interferes, and the A-MPDU frame being received from the communication apparatus 10Tx (BSS) cannot be correctly decoded ("Error" of C in FIG. 4 corresponding to "T_Data" of E in FIG. 4).

That is, since the communication apparatus 20Tx (Other System) of another system has not detected a signal over a predetermined duration (T_LBT) on the frequency channel f3, the communication apparatus 20Tx (Other System) transmits the data (signal) over the predetermined duration even though the communication apparatus 10Rx (BSS) is receiving the A-MPDU frame ("T_Data" of E in FIG. 4).

Therefore, the communication apparatus 10Rx (BSS) cannot correctly decode the data of the part of MPDU 3 and MPDU 4 in the A-MPDU frame, and detects that an error has occurred. Furthermore, the communication apparatus 20Tx (Other System) has not detected a signal over the predetermined duration (T_LBT), and therefore, the communication apparatus 20Tx (Other System) transmits the data again ("T_Data" of E in FIG. 4).

As described above, a configuration is required in which, in a case where data is transmitted using a certain frequency channel in the communication apparatus 10Tx and the communication apparatus 10Rx, the other frequency channels are monitored, and available frequency channels are grasped each time.

Moreover, at time t6, the communication apparatus 10Rx (OBSS2) transmits a CTS frame using the frequency channel f2 ("CTS" of D in FIG. 4).

This CTS frame is received (detected) by the communication apparatus 10Rx (BSS) ("Rx" of C in FIG. 4 corresponding to "CTS" of D in FIG. 4). At this time, in the communication apparatus 10Rx (BSS), the network allocation vector (NAV) of the frequency channel f2 is set until the data reception of the communication apparatus 10Rx (OBSS2) thereafter ends ("NAV" of C in FIG. 4).

After that, when the transmission of the predetermined A-MPDU frame transmitted from the communication apparatus 10Tx (BSS) ends, an SACK frame, which is a kind of block ACK frame, is returned from the communication apparatus 10Rx (BSS) at the timing immediately after the transmission ("SACK" of C in FIG. 4).

Here, the communication apparatus 10Rx (BSS) determines the frequency channel available in the communication apparatus 10Tx (BSS) for the frequency channel for returning the SACK frame in consideration of the available channel information (on the transmitting side) acquired from the latest received delimiter (D), and the frequency channel available in the periphery of own (frequency channel in which the NAV has not been set).

Specifically, at time t7, a SACK frame is transmitted using the frequency channels f3 and f4 that are available by both the communication apparatus 10Tx (BSS) and the communication apparatus 10Rx (BSS) ("SACK" of "f3", "f4" of C in "FIG. 4").

At this time, the communication apparatus 10Tx (BSS) can receive the SACK frame more reliably on both the frequency channels f3 and f4 by waiting for the SACK frame on the frequency channel that is available by the communication apparatus 10Tx (BSS) or on all the monitored frequency channels ("Rx" of A in FIG. 4 corresponding to "SACK" of C in FIG. 4).

Then, in a case where the communication apparatus 10Tx (BSS) grasps the data (MPDU3, MPDU4) that has not been received by the communication apparatus 10Rx (BSS) on the basis of the ACK information included in the SACK frame, the communication apparatus 10Tx (BSS) retransmits the data.

That is, at time t8 that is the transmission timing thereafter, the communication apparatus 10Tx (BSS) retransmits the undelivered data (MPDU3, MPDU4) of the A-MPDU frame by using the frequency channels f3 and f4 on which the SACK frame has been received ("P D MPDU4 D MPDU3" of "f3", "P D MPDU3 D MPDU4" of "f4" of A in FIG. 4).

Here, the communication apparatus 10Tx (BSS) performs transmission by changing the order of the MPDUs to be aggregated on different frequency channels, so that the communication apparatus 10Rx (BSS) can transmit data more reliably on a plurality of frequency channels that are the most recently available.

On the other hand, the communication apparatus 10Rx (BSS) can receive the retransmission data frame more reliably on both the frequency channels f3, f4 by waiting for the retransmission data frame retransmitted on the frequency channel that is available by the communication apparatus 10Rx (BSS) or all the monitored frequency channels ("Rx" of C in FIG. 4 corresponding to "P D MPDU4 D MPDU3" of "f3" and "P D MPDU3 D MPDU4" of "f4" of A in FIG. 4).

Note that, at time t8, the delimiter (D) is arranged in the A-MPDU frame, but in the communication apparatus 10Tx (BSS), the frequency channels f2, f3, and f4 are described in the available channel information as available frequency channels, and included in the delimiter (D).

Moreover, also at time t9, the delimiter (D) is arranged in the A-MPDU frame, and at this time, a state is established where the data transmission by the communication apparatus 10Tx (OBSS1) has ended, and the frequency channel f1 is available. Therefore, in the communication apparatus 10Tx (BSS), the frequency channels f1 to f4 are described in the available channel information as available frequency channels, and included in the delimiter (D).

Therefore, the communication apparatus 10Rx (BSS) acquires the available channel information of these delimiters (D) from the received A-MPDU frame, and thereafter, can grasp the frequency channel that is available for returning the SACK frame each time when returning the SACK frame.

Then, the communication apparatus 10Rx (BSS) can receive the A-MPDU frame retransmitted from the communication apparatus 10Tx (BSS) using both the frequency channels f3 and f4.

Here, at time t10, in a case where the communication apparatus 20Tx (Other System) transmits data using the frequency channel f3 ("T_Data" of E in FIG. 4), in the communication apparatus 10Rx (BSS), there is a problem that the data (signal) interferes, and the retransmission data frame being received from the communication apparatus 10Tx (BSS) cannot be correctly decoded ("Error" of C in FIG. 4 corresponding to "T_Data" of E in FIG. 4).

Therefore, the communication apparatus 10Rx (BSS) cannot correctly decode the data of the part of the MPDU3 transmitted using the frequency channel f3 in the retransmission data frame, and detects that an error has occurred. However, since the A-MPDU frame transmitted using the frequency channel f4 has already correctly received the MPDU3, at this time, the communication apparatus 10Rx (BSS) has received all the data of MPDU1 to MPDU4.

Here, the communication apparatus 10Rx (BSS) determines the frequency channel available in the communication apparatus 10Tx (BSS) for the frequency channel for returning the SACK frame in consideration of the available channel information (on the transmitting side) acquired from the latest received delimiter (D), and the frequency channel available in the periphery of own (frequency channel in which the NAV has not been set).

Specifically, at time t11, a SACK frame is transmitted using the frequency channels f1, f4 that are available by both the communication apparatus 10Tx (BSS) and the communication apparatus 10Rx (BSS) ("SACK" of "f1", "f4" of C in "FIG. 4").

Then, the communication apparatus 10Tx (BSS) receives the SACK frame from the communication apparatus 10Rx (BSS) using the frequency channels f1, f4, and can grasp that all MPDUs have been delivered to the communication apparatus 10Rx (BSS) on the basis of the ACK information included in the SACK frame.

As described above, in the new method, as compared to the method of transmitting data using only one frequency channel like the current method, by using another frequency channel together, it is possible to reliably perform confirmation of receipt of the ACK frame and retransmission of the data frame. Therefore, more reliable communication can be realized.

(Data Frame Configuration)

Figure 5:
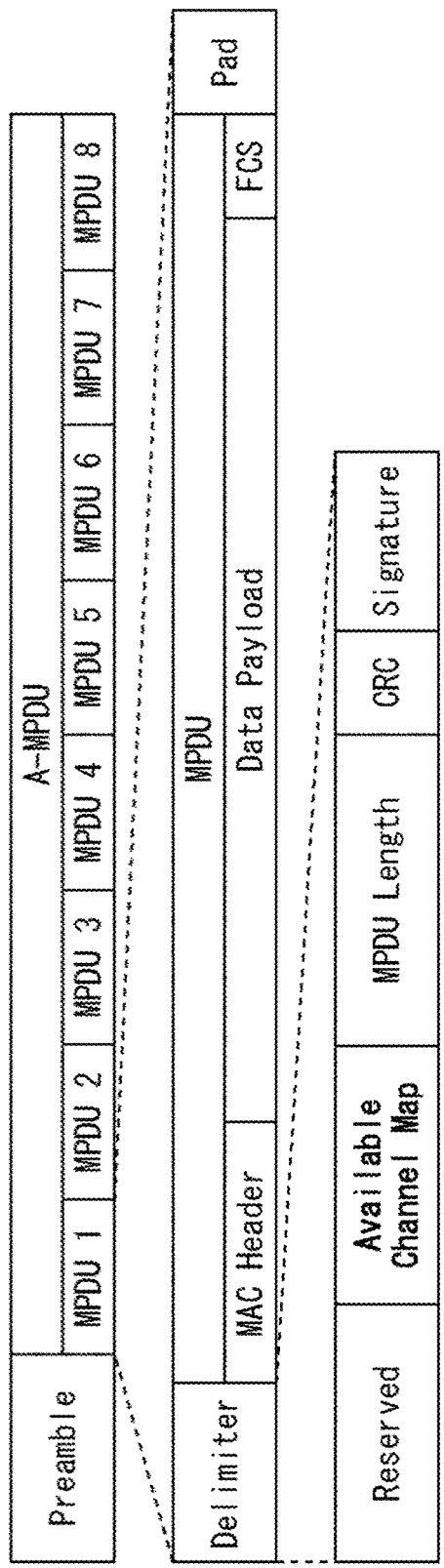
FIG. 5 is a diagram illustrating an example of a configuration of an A-MPDU to which frame aggregation is applied.

FIG. 5 illustrates an example of a configuration of aggregation-MPDU (A-MPDU) to which frame aggregation is applied.

Here, a case of using a frame configuration of an A-MPDU, that is, an A-MPDU in which a plurality of MAC layer protocol data units (MPDUs) is transmitted as one aggregated frame will be described.

Furthermore, since the configuration of the A-MPDU includes MPDUs corresponding to the number of frames to be aggregated, here, an example is illustrated where the A-MPDU as a frame includes eight subframes from MPDU1 to MPDU8, for example.

The A-MPDU is transmitted following a preamble signal (Preamble) of a PHY layer. Furthermore, each MPDU included in the A-MPDU includes a delimiter indicating a subframe boundary and a MAC protocol data unit (MPDU), and is configured by adding a pad as necessary.

Moreover, each MPDU includes a predetermined MAC header, a data payload, and a frame check sequence (FCS).

The delimiter corresponding to the new method includes Reserved for future expansion, Available Channel Map in which available channel information is described, MPDU Length indicating the information length of the MPDU, CRC including error detection codes, and Signature including a signature indicating delimiter.

Note that the respective positions of parameters described in the delimiter are not limited to the order illustrated in FIG. 5, and some parameters may be deleted or added as needed.

Figure 6:
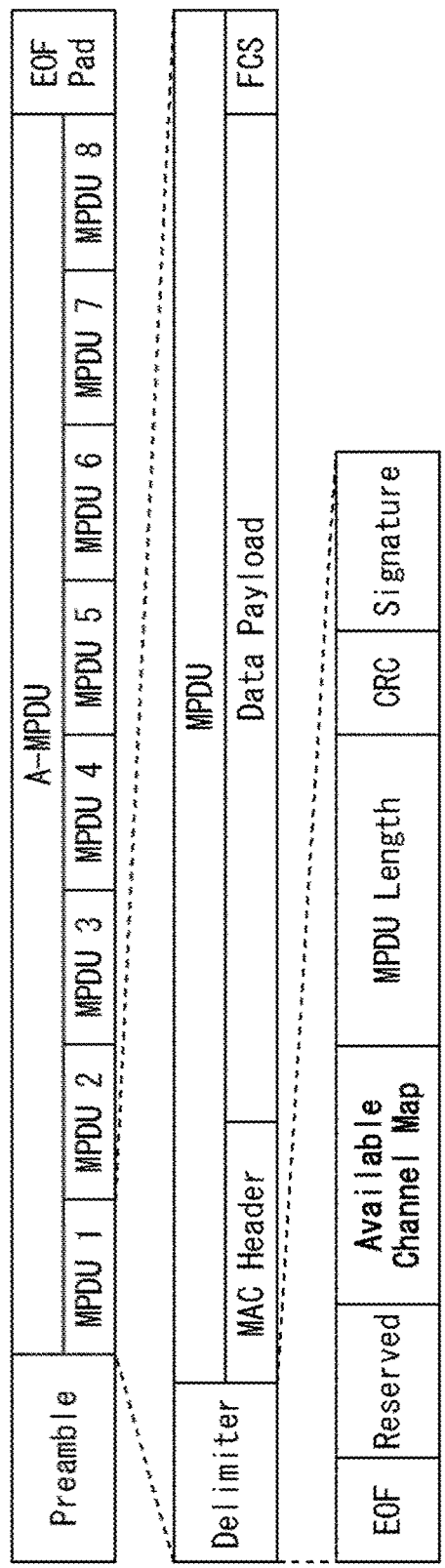
FIG. 6 is a diagram illustrating another example of a configuration of an A-MPDU including available channel information.

FIG. 6 illustrates another example of a configuration of an A-MPDU including available channel information.

Comparing the data frame illustrated in FIG. 6 with the data frame illustrated in FIG. 5, the configuration where a padding position is arranged at one place (EOF Pad) at the end of the frame is different, but configurations of other parts are similar.

Along with this change, the data frame illustrated in FIG. 6 has a configuration where an EOF bit is prepared as a parameter described in the delimiter, and it is possible to identify that only the EOF Pad is set.

(MAC Header Configuration)

FIG. 7 illustrates an example of a MAC header configuration including available channel information.

FIG. 7 illustrates a case where the available channel information is included not only as a parameter of the delimiter but also in a parameter of the MAC header.

The MAC header includes Frame Control indicating the frame format, Duration indicating the duration of the frame, Address1 to Address4 indicating the address information that identifies the communication apparatus 10, Sequence Control indicating the sequence number, QoS Control indicating the QoS parameter, and HT Control indicating high throughput parameters.

In the MAC header corresponding to the new method, the available channel information includes, in addition to these parameters, Start Channel (Start Ch.) indicating the start channel, and Available Channel Map (Available Ch. Map) indicating bitmap information of the available frequency channels.

(Information Element Configuration)

FIG. 8 illustrates an example of a configuration of an information element including available channel information.

The available channel information may be configured as a management frame or an action frame as one of the MPDUs, and FIG. 8 illustrates a configuration in a case of an information element format required for such a configuration.

This information element includes Element Type indicating the format of the information element, Length indicating the information length, Transmit Address indicating the address of the communication apparatus 10 on the transmitting side, Receive Address indicating the address of the communication apparatus 10 on the receiving side, BA Control and BA Information including the block ACK parameter, Transfer Information including transmission-related parameters, and FCS for error detection, and in addition, Start Channel (Start Ch.) and Available Channel Map.

That is, the information element corresponding to the new method includes, as the available channel information, Start Channel indicating the start channel, and Available Channel Map indicating bitmap information of the available frequency channels.

(PHY Layer Configuration)

Figure 9:
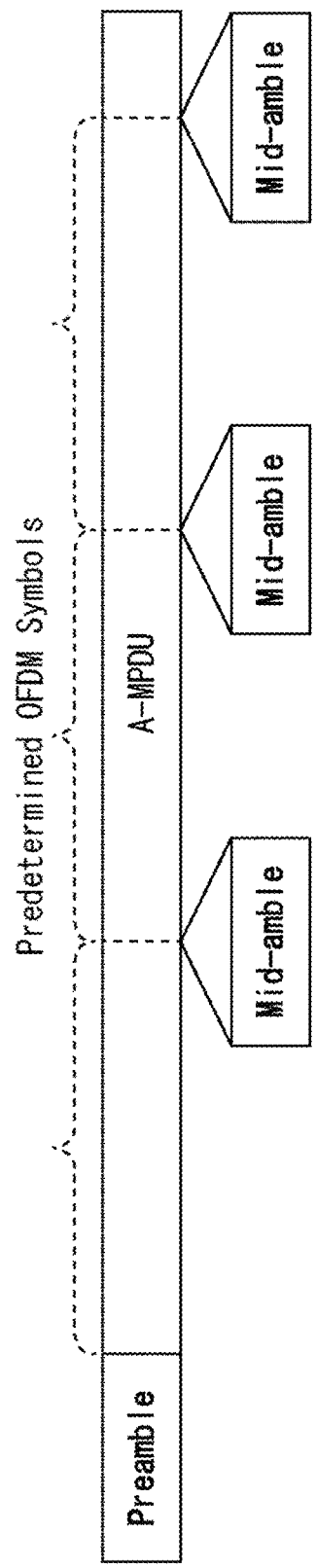
FIG. 9 is a diagram illustrating an example in which available channel information is configured as a parameter that can be identified in a PHY layer.

FIG. 9 illustrates an example in which available channel information is configured as a parameter that can be identified in a PHY layer.

The available channel information may be arranged in the preamble signal of the PHY layer, or may be arranged in a signal inserted in the middle of a data frame such as an A-MPDU frame as a mid-amble signal in a case where resynchronization is performed.

FIG. 9 schematically illustrates a state where the A-MPDU is transmitted following the predetermined preamble signal (Preamble), and mid-amble signals (Mid-amble) are inserted to three positions for each predetermined orthogonal frequency division multiplexing (OFDM) symbol including the data of the A-MPDU.

Here, the detailed configuration of the preamble signal is illustrated in FIG. 10. That is, the preamble signal includes a predetermined number of pieces of HE-LTF repeated by the number of spatial multiplexing, in addition to L-STF, L-LTF, L-SIG, RL-SIG, HE-SIG-A, and HE-STF.

Specifically, L-STF indicates a conventional short training field and L-LTF indicates a conventional long training field.

Furthermore, L-SIG indicates conventional signaling information, RL-SIG indicates repetitive signaling information, and HE-SIG-A indicates high-density signaling information. Moreover, HE-STF indicates a high density short training field and HE-LTF indicates a high density long training field.

In addition to these parameters, the preamble signal corresponding to the new method includes Channel Signal as available channel information, which indicates information for identifying available frequency channels.

Furthermore, the detailed configuration of the mid-amble signal is illustrated in FIG. 11. That is, the mid-amble signal includes L-STF indicating a conventional short training field, L-LTF indicating a conventional long training field, L-SIG indicating conventional signaling information, HE-SIG-A indicating high-density signaling information, and the like.

In addition to these parameters, the mid-amble signal corresponding to the new method includes Channel Signal as available channel information, which indicates information for identifying available frequency channels.

Note that the configuration of the mid-amble signal illustrated in FIG. 11 is an example, and some of the parameters included in the mid-amble signal may be deleted or other parameters may be added, as needed.

(SACK Frame Configuration)

FIG. 12 illustrates an example of the configuration of a Simulcast Block ACK (SACK) frame to which the present technology is applied.

This SACK frame is basically configured to be independently transmitted following a predetermined preamble signal.

In FIG. 12, the SACK frame includes Frame Control indicating the frame format, Duration indicating the duration of the frame, Transmit Address indicating the address information for identifying the communication apparatus 10 on the transmitting side, Receive Address indicating address information for identifying the communication apparatus 10 on the receiving side, BA Control and BA Information including block ACK parameter, and FCS for error detection, and in addition, Start Channel and Available Channel Map.

That is, the SACK frame corresponding to the new method includes Start Channel indicating the start channel, and Available Channel Map indicating bitmap information of the available frequency channels.

Furthermore, the control information of the block ACK is described in BA Control. In BA Information, information for identifying the received MPDU (hereinafter, also referred to as specific information) is described as block ACK information. In other words, this specific information can be said to be information regarding the retransmission data (data that needs to be retransmitted) that is specified when the reception is confirmed for each MPDU.

Note that the configuration of the data frame and the configuration of the delimiter, MAC header, and the like described above are examples, and other configurations can be adopted, for example, the order in which the Available Channel Maps are arranged may be changed, other parameters may be added or deleted, or the like.

(Example of Parameters of Available Channel Information)

Next, the parameter configuration of the available channel information will be described with reference to FIGS. 13 to 20.

Here, some variations are illustrated as the parameter configuration of the available channel information, but, for the information to be used among these pieces of information, for example, the following method may be used.

That is, after the communication apparatus 10 on the transmitting side and the communication apparatus 10 on the receiving side negotiate in advance, the communication apparatus 10 on the transmitting side may have a configuration where, as a predetermined format, the available channel information is added to a delimiter, a MAC header, a preamble signal, or a mid-amplifier signal, and the obtained data is transmitted to the communication apparatus 10 on the receiving side.

Here, the available channel information is described in the bitmap format as, for example, a numeral value of "0" if the frequency channel is available, and a numeral value of "1" if the frequency channel is not available, respectively. However, the numerical value may be reversed, that is, a numerical value of "1" if the frequency channel is available, and a numerical value of "0" if the frequency channel is not available.

First Example

FIG. 13 illustrates a configuration in which the possibility of using the predetermined eight channels indicated as Channels 1 to 8 is judged.

In FIG. 13, Bit 0 is assigned to the frequency channel 1 and Bit 1 is assigned to the frequency channel 2. As similar to this, Bits 2 to 7 are assigned to the frequency channels 3 to 8, respectively. Therefore, it is possible to judge whether or not the frequency channel is available for each corresponding frequency channel on the basis of the bit value corresponding to the predetermined eight channels.

Second Example

FIG. 14 illustrates a configuration in which the possibility of using a frequency channel represented in the vertical direction of the base channel is judged on the basis of the base channel for transmitting the data frame.

In FIG. 14, Bit 0 is assigned to the lower three channels of the base channel, Bit 1 is assigned to the lower two channels of the base channel, and Bit 2 is assigned to the lower one channel of the base channel, respectively. Furthermore, Bit 3 is assigned to the upper one channel of the base channel, Bit 4 is assigned to the upper two channels of the base channel, and Bit 5 is assigned to the upper three channels of the base channel, respectively.

Therefore, it is possible to judge whether or not the frequency channel is available for each corresponding frequency channel on the basis of the bit value corresponding to the upper and lower three channels of the base channel. Note that since the base channel itself is a frequency channel used by the communication apparatus 10 to transmit a data frame, the base channel can be omitted, and is excluded from the example of FIG. 14.

Third Example

FIG. 15 illustrates a configuration in which the possibility of using a frequency channel including a base channel is judged as available channel information.

In FIG. 15, Bit 0 is assigned to the base channel, Bit 1 is assigned to the upper one channel of the base channel, Bit 2 is assigned to the lower one channel of the base channel, Bit 3 is assigned to the upper two channels of the base channel, and Bit 4 is assigned to the lower two channels of the base channel, respectively.

Therefore, it is possible to judge whether or not the frequency channel is available for each corresponding frequency channel on the basis of the bit value corresponding to the upper and lower two channels of the base channel.

Note that the number of upper and lower channels illustrated in FIG. 15 is an example, and in a case where more pieces of upper channel or lower channel information are required, by adding information regarding each of available channels alternately, it is possible to notify information regarding the availability of more frequency channels.

Fourth Example

FIG. 16 illustrates an example in a case where the available channel information is configured as 4-bit information as an example of a simpler configuration.

In FIG. 16, Bit 0 is assigned to the lower two channels of the base channel, Bit 1 is assigned to the lower one channel of the base channel, Bit 2 is assigned to the upper one channel of the base channel, and Bit 3 is assigned to the upper two channels of the base channel, respectively.

Therefore, it is possible to judge whether or not the frequency channel is available for each corresponding frequency channel on the basis of the bit value corresponding to the upper and lower two channels of the base channel. Note that, also here, the base channel itself is excluded.

Fifth Example

FIG. 17 illustrates an example in a case where the available channel information is configured for each secondary channel.

In FIG. 17, the base channel (primary channel) is omitted, Bit 0 is assigned to a secondary channel with 20 MHz bandwidth, Bit 1 is assigned to a secondary channel with 40 MHz bandwidth, Bit 2 is assigned to a secondary channel with 80 MHz bandwidth, and Bit 3 is assigned to a secondary channel with 160 MHz, respectively.

Therefore, it is possible to judge whether or not the frequency channel is available for each corresponding frequency channel on the basis of the bit value corresponding to the secondary channels.

Figure 18:
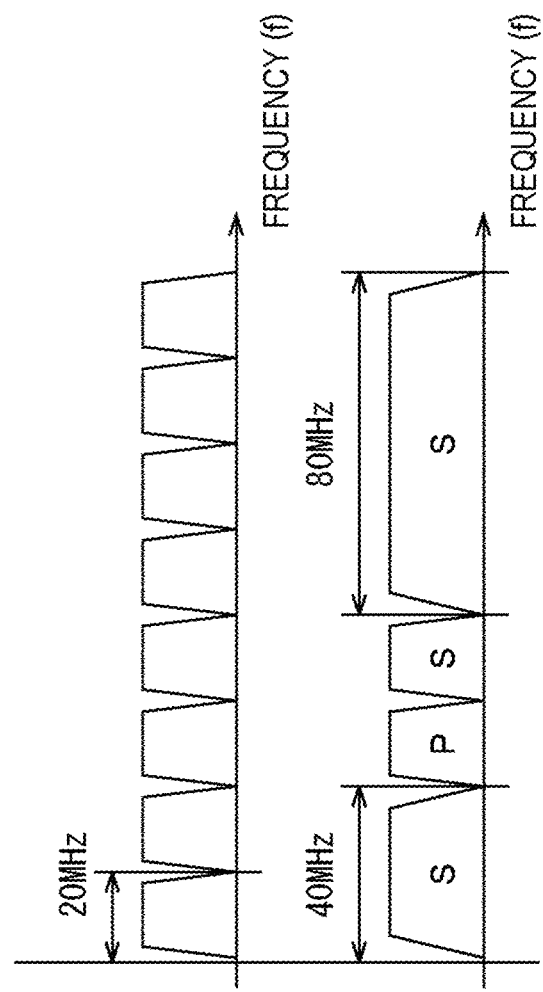
FIG. 18 is a diagram illustrating an example of a configuration of a primary channel and a secondary channel.

Here, FIG. 18 illustrates an example of the configuration of a primary channel (P) and a secondary channel (S).

In FIG. 18, for example, in addition to using only the primary channel (P) with 20 MHz bandwidth, the bandwidth can be set to 40 MHz (20 MHz+20 MHz) by using the primary channel (P) and the secondary channel (S) with 20 MHz bandwidth to the right of the primary channel (P).

Furthermore, by using the secondary channel (S) with 40 MHz bandwidth on the left side, the bandwidth can be set to 80 MHz (40 MHz+20 MHz+20 MHz), and moreover, by using the secondary channel (S) with 80 MHz bandwidth on the right side, the bandwidth can be set to 160 MHz (40 MHz+20 MHz+20 MHz+80 MHz).

Sixth Example

FIG. 19 illustrates another example in a case where the available channel information is represented in the bitmap format.

In FIG. 19, each bit of a 32-bit bitmap is represented by numbers from 0 to 31. Here, the first Bit 0 is represented as 36 channel, the next Bit 1 is represented as 40 channel, . . . , and the last Bit 31 is represented as 160 channel, and available frequency channels are assigned to each bit.

Figure 20:
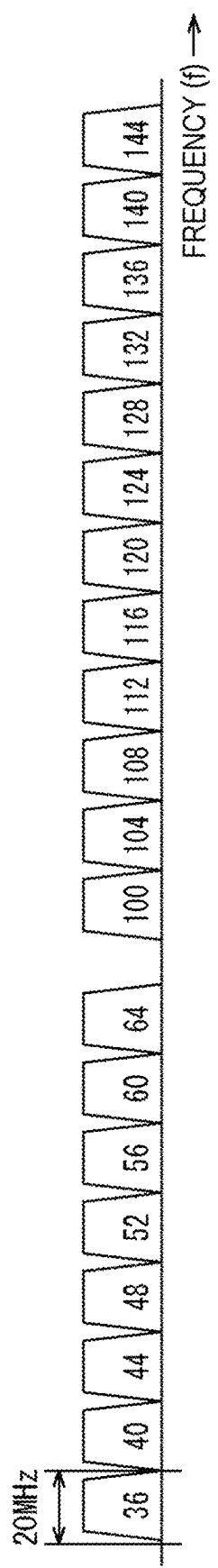
FIG. 20 is a diagram illustrating an example of arrangement of frequency channels available in a wireless LAN system.

Here, FIG. 20 illustrates an example of the arrangement of frequency channels that are available in the wireless LAN system. In the example of FIG. 20, channels 36, 40, 44, 48, 52, 56, 60, 64 are arranged from the lower frequency in units of 20 MHz according to the center frequency. At higher frequencies, channels 100, 104, 108, 112, 116, 120, 124, 128, 132, 136, 140, 144 are arranged in units of 20 MHz.

That is, in FIGS. 19 and 20, the frequency channel numbers correspond to each other, and it is possible to specify whether or not the frequency channel is available for each frequency channel assigned in units of 20 MHz. For example, in the available channel information, among the available frequency channels represented by Bit 0 to 31, the bit corresponding to the available frequency channel can be set to "1", and the other bits can be set to "0".

As described above, channel information related to the frequency channel is described in the available channel information in the bitmap format or the like, and it is possible to judge whether or not a frequency channel is an available frequency channel for each corresponding frequency channel.

Note that the parameter configuration of the available channel information described above is an example, and for example, the variations illustrated here may be rearranged and configured.

Furthermore, in the above-described configuration, the available channel information is represented in the bitmap format, but the present technology is not limited to such a format, and as the available frequency channel information, other format may be adopted as long as the availability of the frequency channel can be specified.

Furthermore, the example of frequency channel arrangement illustrated in FIG. 20 is an example, and since the available frequency bands legalized in each country are different, there is a case where each of these available frequency channels has a different range. Here, for example, a frequency bandwidth narrower than the frequency bandwidth of 20 MHz can be used. Specifically, for example, the frequency bandwidth may correspond to the unit of the resource unit specified by IEEE802.11ax.

(Example of Communication Apparatus Configuration)

Figure 21:
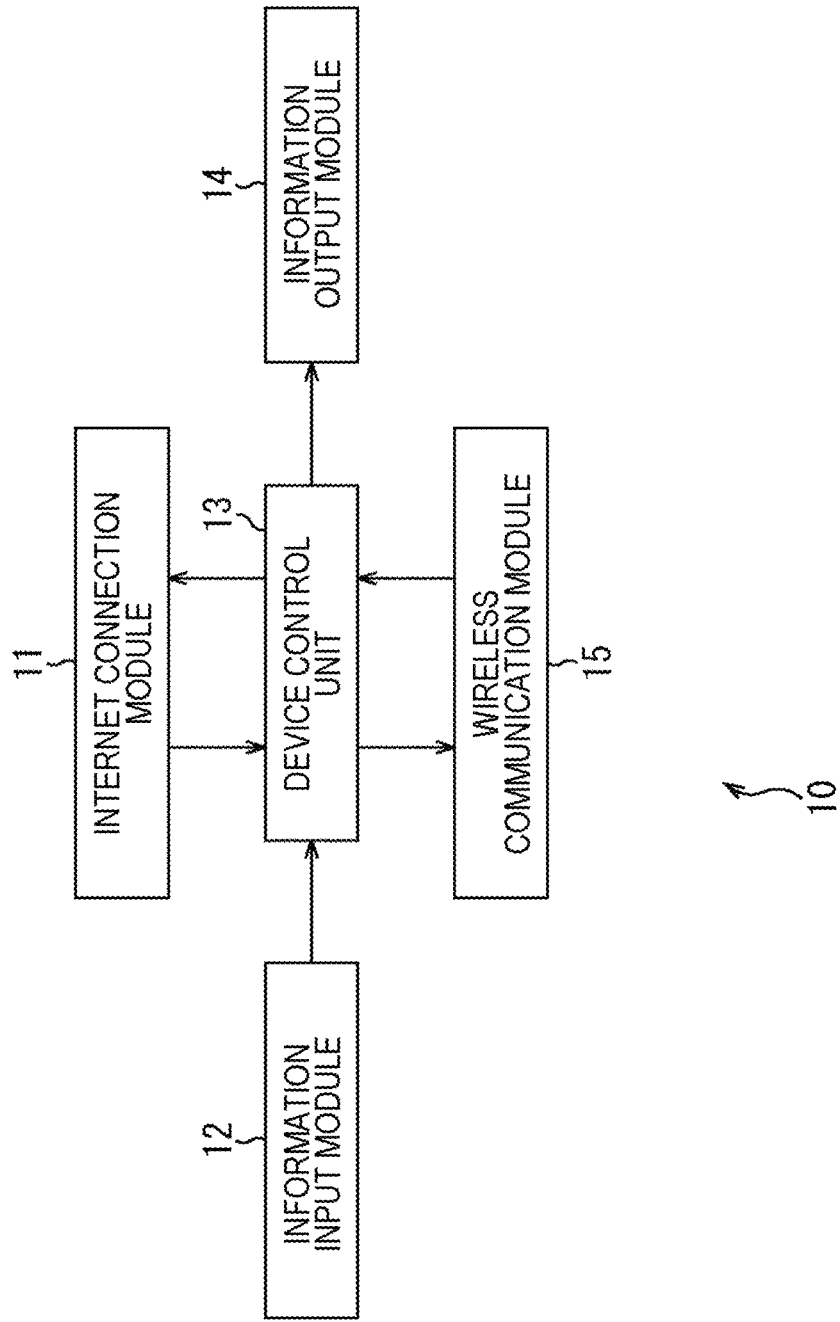
FIG. 21 is a block diagram illustrating an example of a configuration of a communication apparatus to which the present technology is applied.

FIG. 21 is a block diagram illustrating an example of a configuration of a communication apparatus (wireless communication apparatus) to which the present technology is applied. The communication apparatus 10 illustrated in FIG. 21 is configured as a communication apparatus 10Tx on the transmitting side or a communication apparatus 10Rx on the receiving side in the wireless network (FIG. 1).

In FIG. 21, the communication apparatus 10 includes an Internet connection module 11, an information input module 12, a device control unit 13, an information output module 14, and a wireless communication module 15.

The Internet connection module 11 includes, for example, a circuit having a function for connecting to an Internet network from an optical fiber network or other communication line via a service provider as a base station (access point), peripheral circuits of the circuit, a microcontroller, a semiconductor memory, and the like.

The Internet connection module 11 performs various processing related to the Internet connection in accordance with the control from the device control unit 13. For example, the Internet connection module 11 has a configuration in which a function such as a communication modem for connecting to an Internet network is implemented in a case where the communication apparatus 10 operates as a base station.

The information input module 12 includes input devices such as push buttons, a keyboard, and a touch panel, for example. The information input module 12 has a function of inputting instruction information corresponding to an instruction from the user to the device control unit 13.

The device control unit 13 includes, for example, a microprocessor, a microcontroller, and the like. The device control unit 13 controls each unit (module) in order to operate the communication apparatus 10 as a base station or a terminal station.

The device control unit 13 performs various processing on the information supplied from the Internet connection module 11, the information input module 12, or the wireless communication module 15. Furthermore, the device control unit 13 supplies the information obtained as a result of its own processing to the Internet connection module 11, the information output module 14, or the wireless communication module 15.

For example, the device control unit 13 supplies transmission data passed from an application or the like in the upper layer of the protocol to the wireless communication module 15 when transmitting data, or passes received data supplied from the wireless communication module 15 when receiving data to an application or the like in the upper layer of the protocol.

The information output module 14 includes an output device including a display element such as a liquid crystal display (LCD), an organic light emitting diode (OLED) display, or a light emitting diode (LED) display, for example.

The information output module 14 has a function of displaying necessary information to the user on the basis of the information supplied from the device control unit 13. Here, the information processed by the information output module 14 includes, for example, the operating state of the communication apparatus 10, information obtained via the Internet network, and the like.

The wireless communication module 15 includes, for example, a wireless chip, peripheral circuits, a microcontroller, a semiconductor memory, and the like. The wireless communication module 15 performs various processing related to wireless communication in accordance with the control from the device control unit 13. Details of the configuration of the wireless communication module 15 will be described later with reference to FIG. 22.

Note that, here, a wireless communication module equipped with a wireless communication chip, peripheral circuits, and the like will be described as an example, but the present technology can be applied not only to the wireless communication module but also to, for example, a wireless communication chip, a wireless communication LSI, and the like. Moreover, in the wireless communication module, it is optional to include an antenna.

Furthermore, in the communication apparatus 10 of FIG. 21, the device control unit 13 and the wireless communication module 15 are indispensable components, but it is optional to include the Internet connection module 11, the information input module 12, and the information output module 14 as components.

That is, each communication apparatus 10 that operates as a base station or a terminal station can include only necessary modules, and unnecessary parts can be simplified or can be excluded. More specifically, for example, the Internet connection module 11 can be incorporated only in the base station, and the information input module 12 and the information output module 14 can be incorporated only in the terminal station.

(Example of Wireless Communication Module Configuration)

Figure 22:
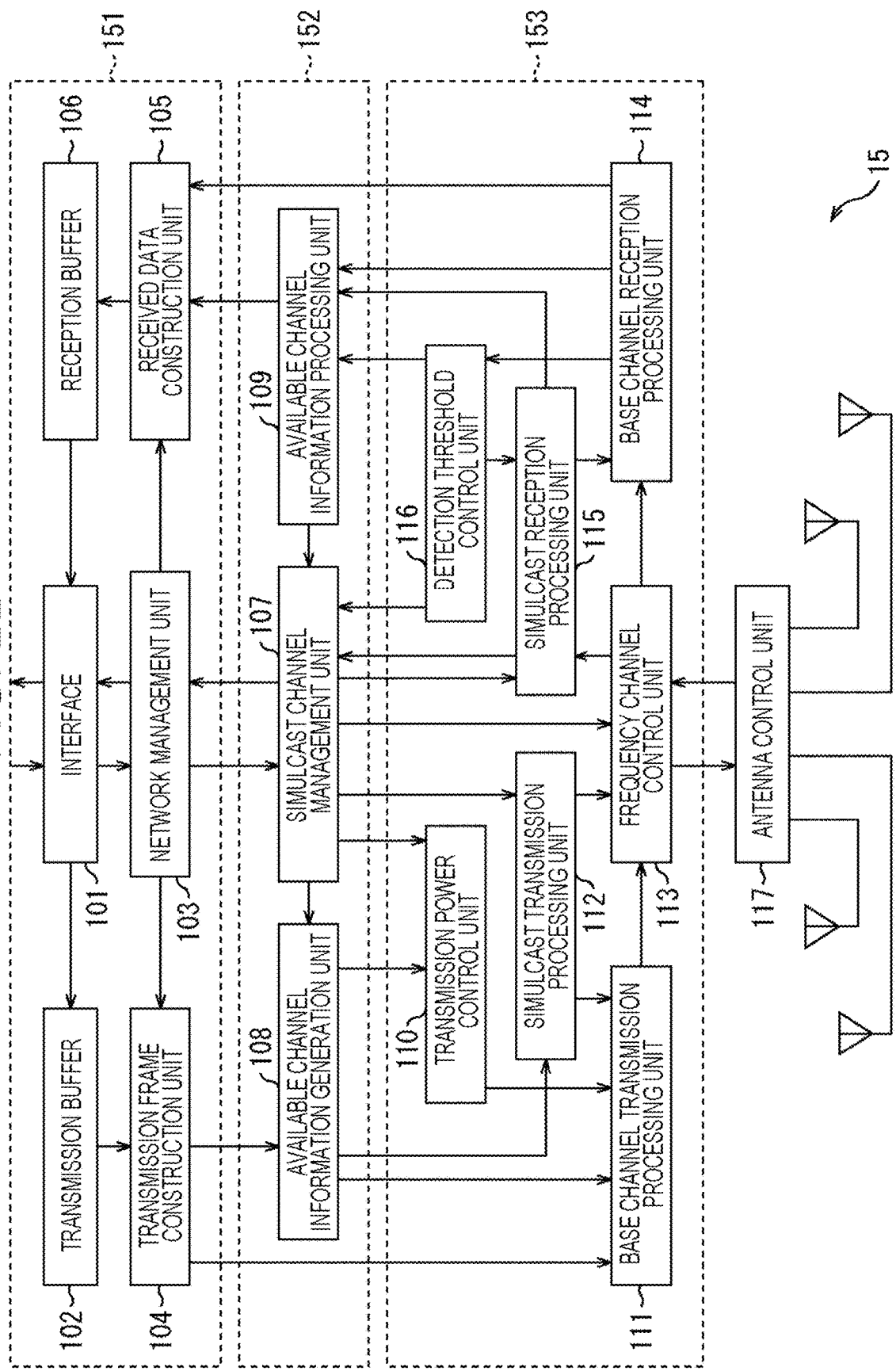
FIG. 22 is a block diagram illustrating an example of a configuration of a wireless communication module.

FIG. 22 is a block diagram illustrating an example of a configuration of the wireless communication module 15 of FIG. 21.

In the wireless communication module 15, an interface 101, a transmission buffer 102, a network management unit 103, a transmission frame construction unit 104, a received data construction unit 105, and a reception buffer 106 are configured as common portions between the communication apparatus on the transmitting side and the communication apparatus on the receiving side for the communication apparatus (wireless communication modules) corresponding to the current method.

Furthermore, as a characteristic configuration corresponding to the new method, the wireless communication module 15 includes a simulcast channel management unit 107, an available channel information generation unit 108, and an available channel information processing unit 109, and includes a processor that mainly specifies available frequency channels, and the like. With this characteristic configuration, available channel information can be described in the delimiter or the like.

Moreover, in the wireless communication module 15, a transmission power control unit 110, a base channel transmission processing unit 111, a simulcast transmission processing unit 112, a frequency channel control unit 113, a base channel reception processing unit 114, a simulcast reception processing unit 115, and a detection threshold control unit 116 are configured for an operation of transmitting and receiving signals at a predetermined timing.

The interface 101 includes, for example, an input and output interface circuit or the like. The interface 101 is an interface for exchanging data with the device control unit 13 (FIG. 21), and has a function of exchanging information input to the interface and information output from the interface in a predetermined signal format.

The interface 101 writes the transmission data input from the device control unit 13 to the transmission buffer 102. Furthermore, the interface 101 supplies the information input from the device control unit 13 to the network management unit 103, or outputs the information supplied from the network management unit 103 to the device control unit 13.

The transmission buffer 102 includes, for example, a semiconductor memory device such as a buffer memory. The transmission buffer 102 temporarily stores the transmission data written via the interface 101.

The network management unit 103 manages the address information and the like of the communication apparatus 10 in the wireless network. Furthermore, the network management unit 103 is configured to connect to the Internet network in a case where the communication apparatus 10 is operating as a base station.

The transmission frame construction unit 104 has a function of reading the transmission data stored in the transmission buffer 102 and constructing the transmission data as a data frame for transmission by wireless communication, and for example, constructs a plurality of MPDUs stored in the transmission buffer 102, and supplies the A-MPDU frame to the base channel transmission processing unit 111.

The received data construction unit 105 has a function of removing predetermined header information from the received data frame (for example, A-MPDU frame), extracting the MPDU, and extracting only the required data portion. The data portion extracted by the received data construction unit 105 is written to the reception buffer 106.

The reception buffer 106 includes, for example, a semiconductor memory device such as a buffer memory. The reception buffer 106 is a buffer for temporarily storing the extracted portion until all pieces of data are collected, on the basis of a sequence, and is configured to store data until the timing for outputting the received data to the device control unit 13 (for example, the connected application device) is reached.

Then, when the timing for outputting the received data is reached, the received data stored in the reception buffer 106 is appropriately read and output to the device control unit 13 via the interface 101.

The simulcast channel management unit 107 has a function of centrally managing the control of transmitting and receiving information by simultaneously using a plurality of frequency channels by the new method, and grasps the available frequency channels each time.

The available channel information generation unit 108 has a function of constructing information such as available channel information required for the communication control protocol. For example, the communication apparatus 10Tx on the transmitting side is configured to construct the information included in the delimiter of the data frame, and the communication apparatus 10Rx on the receiving side is configured to construct the information included in the control frame such as the SACK frame.

The available channel information processing unit 109 has a function of receiving control information required for the communication control protocol. For example, the communication apparatus 10Tx on the transmitting side is configured to analyze information included in a control frame such as a SACK frame, and the communication apparatus 10Rx on the receiving side is configured to analyze information included in the delimiter of the data frame.

The transmission power control unit 110 has a function of controlling the transmission power so that the signal does not reach an unnecessary radio wave reachable range in a case where a predetermined frame is transmitted, and here, the transmission power control unit 110 has a function of controlling to adjust the minimum necessary transmission power so that the signal reaches the communication apparatus 10Rx on the receiving side with an intended received electric field strength and transmit the data. Here, for example, the transmission power can be adjusted for each frame to be transmitted.

The base channel transmission processing unit 111 has a function of adding a predetermined preamble signal to information such as a data frame to be wirelessly transmitted in a predetermined frequency channel, converting the result into a baseband signal of a predetermined format, and processing the result as an analog signal.

The simulcast transmission processing unit 112 has a function of transmitting a data frame or a control frame such as a SACK frame, on a frequency channel for performing simulcast according to control from the simulcast channel management unit 107.

Note that the simulcast transmission processing unit 112 may include hardware similar to that of the base channel transmission processing unit 111 described above, may include, for example, the minimum necessary circuits for preparing a frame such as a SACK frame or a retransmission data frame in advance, and may also include identical circuits in parallel according to the number of frequency channels to be used.

The frequency channel control unit 113 has a function of setting a frequency channel to be used for (a frame including) data and control information transmitted and received between the base channel and the simulcast channel. The frequency channel control unit 113 is configured to switch and control a frequency channel for transmitting and receiving a data frame or a SACK frame, for example.

The base channel reception processing unit 114 has a function of, in a case of detecting a predetermined preamble signal, separating individual streams, and performing reception processing for receiving a header or a data portion added after the preamble signal.

The simulcast reception processing unit 115 has a function of receiving a data frame or a control frame such as a SACK frame, on a frequency channel for performing simulcast according to control from the simulcast channel management unit 107.

Note that the simulcast reception processing unit 115 may include hardware similar to that of the base channel reception processing unit 114 described above, may include, for example, a circuit for performing carrier detection, a circuit for acquiring header parameters, and the like, and may also include identical circuits in parallel according to the number of frequency channels for simultaneously detecting the situation.

The detection threshold control unit 116 has a function of setting, in a case where the transmission power control unit 110 performs transmission power control, a signal detection level that can detect signal from the communication apparatus 10 existing within the range, and here, controlling so that a signal can be detected with the minimum necessary detection threshold. Then, the detection threshold control unit 116 is configured to detect a signal of a predetermined detection level or higher if there is a frequency channel currently in use.

The antenna control unit 117 is configured by connecting a plurality of antenna elements. The antenna control unit 117 performs control to transmit a signal as a spatial multiplex stream (wireless transmission) and to receive a signal transmitted as a spatial multiplex stream (wireless reception).

Note that, in FIG. 22, the arrows in each block represent the flow and control of data (signals), and each block operates in cooperation with other blocks connected by the arrows in order to realize its own function.

That is, for example, in order to realize a function of centrally managing the control of transmitting and receiving information by simultaneously using a plurality of frequency channels, the simulcast channel management unit 107 operates in cooperation with each of the network management unit 103, the available channel information generation unit 108, the available channel information processing unit 109, the transmission power control unit 110, the simulcast transmission processing unit 112, the frequency channel control unit 113, the simulcast reception processing unit 115, and the detection threshold control unit 116.

Furthermore, in FIG. 22, each unit included in the wireless communication module 15 can be divided into three blocks, for example, a transmission and received data input and output unit 151, a control unit 152, and a wireless signal transmission and reception unit 153, as shown by a broken line frame, but may be divided into blocks of other numbers (for example, four or more).

Here, the transmission and received data input and output unit 151 includes the interface 101, the transmission buffer 102, the network management unit 103, the transmission frame construction unit 104, the received data construction unit 105, and the reception buffer 106, and mainly performs processing and control related to transmission data and output received data.

Furthermore, the control unit 152 includes the simulcast channel management unit 107, the available channel information generation unit 108, and the available channel information processing unit 109, and mainly performs processing and control related to transmission and reception of frames. Note that the control unit 152 may include other blocks such as the simulcast transmission processing unit 112, the frequency channel control unit 113, and the simulcast reception processing unit 115.

Moreover, the wireless signal transmission and reception unit 153 includes the transmission power control unit 110, the base channel transmission processing unit 111, the simulcast transmission processing unit 112, the frequency channel control unit 113, the base channel reception processing unit 114, the simulcast reception processing unit 115, and the detection threshold control unit 116, and mainly performs processing and control related to a signal such as a transmission signal and a received signal.

In the wireless communication module 15 configured as described above, in particular, for example, the processing below is performed by the control unit 152 including the simulcast channel management unit 107, the available channel information generation unit 108, the available channel information processing unit 109, the simulcast transmission processing unit 112, the frequency channel control unit 113, and the simulcast reception processing unit 115.

That is, in the communication apparatus 10Tx on the transmitting side (wireless communication module 15 thereof), the control unit 152 performs control of using the available frequency channels to transmit a data frame (for example, an A-MPDU frame) to the communication apparatus 10Rx on the receiving side, and adding available channel information (for example, Available Channel Map in FIGS. 13 to 17 and 19) related to the frequency channel that is available for transmitting and receiving a frame, to a data frame (for example, the delimiter of FIG. 5 or 6, the MAC header of FIG. 7, the information element of FIG. 8, the preamble signal of FIG. 10, and the mid-amble signal of FIG. 11).

Furthermore, in the communication apparatus 10Rx on the receiving side (wireless communication module 15 thereof), the control unit 152 performs control of using the available frequency channels to receive a data frame (for example, an A-MPDU frame) transmitted from the communication apparatus 10Tx on the transmitting side, specifying a frequency channel that is available for transmitting and receiving a frame on the basis of available channel information (for example, Available Channel Map in FIGS. 13 to 17 and 19) included in a data frame (for example, the delimiter of FIG. 5 or 6, the MAC header of FIG. 7, the information element of FIG. 8, the preamble signal of FIG. 10, and the mid-amble signal of FIG. 11), and using the specified available frequency channel to transmit a confirmation signal (for example, a SACK frame of FIG. 12) used for confirmation of reception of the data frame, to the communication apparatus 10Tx on the transmitting side.

(Operation on Data Transmitting Side)

First, the operation of the communication apparatus 10Tx (wireless communication module 15) on the data frame transmitting side will be described with reference to the flowcharts of FIGS. 23 and 24. Note that, here, the case where the available channel information is described in the delimiter of the A-MPDU frame is illustrated as an example.

In the wireless communication module 15, the base channel for performing the transmission of the data frame is set (S101). By this setting of baseband, it is assumed that the connection with the communication apparatus 10Rx on the receiving side is secured by following a predetermined authentication procedure.

Here, in the wireless communication module 15, in a case of transmitting a data frame, when transmitting an A-MPDU frame as an aggregated MPDU (S102), it is determined whether or not simulcast reception is supported (S103).

In a case where it is determined in the determination processing of Step S103 that the simulcast reception is supported, the processing proceeds to Step S104. Then, the simulcast channel management unit 107 sets the simulcast reception channel as the frequency channel for the simulcast reception (S104). When the processing of Step S104 is completed, the processing of Steps S105 to 110 is performed.

In the available channel information generation unit 108, when the A-MPDU frame is constructed, information regarding (the status of) the simulcast channel, which is a frequency channel used in simulcast, that is, available channel information is generated and described in the delimiter, for example (S105).

Then, in the wireless communication module 15, the A-MPDU frame including the delimiter in which the available channel information is described is transmitted in MPDU units (S106).

At this time, in the simulcast reception channel for which reception is set, the simulcast channel reception processing (S107) is performed at each frequency channel until the boundary of the MPDU is reached ("NO" in S108). Note that the details of the simulcast channel reception processing will be described later with reference to the flowchart of FIG. 27.

Then, in a case where it is determined that the boundary of the MPDU is reached ("YES" in S108), in the simulcast channel management unit 107, the status of the simulcast channel is acquired and it is determined whether or not the end of the A-MPDU has been reached (S110).

The processing returns to Step S105, and the processing of steps S105 to S110 are repeated until it is determined in the determination processing of Step S110 that the end of the A-MPDU is reached. Therefore, the available channel information including the information regarding the available frequency channels up to the previous time is continuously described in the delimiter (S105), and the A-MPDU frame including the delimiter is transmitted in MPDU units (S106).

Then, in a case where it is determined that the end of the A-MPDU is reached ("YES" in S110), the processing proceeds to Step S111, and the processing of Steps S111 and S112 is performed.

That is, in the wireless communication module 15, the latest available frequency channels are grasped (S111), and in a case where there is a plurality of available frequency channels, setting of waiting for reception of the block ACK frame is performed on all of the frequency channels (S112).

Note that, in a case where it is determined in the determination processing of Step S103 that the simulcast reception is not supported, the processing of Steps S104 to S111 are skipped, and the processing proceeds to Step S112. In this case, as similar to the current method, the A-MPDU frame is transmitted only on the base channel, and setting of waiting for the reception of the block ACK frame is performed only for that frequency channel (S112).

Thereafter, in the wireless communication module 15, it is determined whether or not the ACK frame from the communication apparatus 10Rx on the receiving side has been received (S113). Note that, here, in a case where simulcast reception is supported, a SACK frame may be received as an ACK frame, and the ACK frames thereafter include the SACK frame.

In a case where it is determined in the determination processing of Step S113 that the ACK frame has been received, the frequency channel that has received the ACK frame is stored as ACK reception channel information (S114).

Furthermore, in the wireless communication module 15, it is determined whether or not there is undelivered data in the communication apparatus 10Rx on the receiving side (S115). In a case where it is determined in the determination processing of Step S115 that there is no undelivered data, since all pieces of the data have been received by the communication apparatus 10Rx on the receiving side, the transmission of a series of data frames ends.

In a case where it is determined in the determination processing of Step S115 that there is undelivered data, the processing proceeds to Step S116, and the processing of Steps S116 and S117 is performed.

That is, in the wireless communication module 15, undelivered data (that is, data that needs to be retransmitted) in the communication apparatus 10Rx on the receiving side is specified on the basis of the specific information included in the ACK frame (S116).

Furthermore, in the simulcast channel management unit 107, a frequency channel used for retransmission is designated from among the available frequency channels as a channel used for retransmission (S117).

On the other hand, in a case where it is determined in the determination processing of Step S113 that the ACK frame has not been received, the processing proceeds to Step S118. Then, in the wireless communication module 15, retransmission of all pieces of data is set (S118).

When the processing of Step S117 or S118 ends, the processing proceeds to Step S119. Here, when retransmitting data, it is determined whether or not a network allocation vector (NAV) has been set as its own simulcast channel among the frequency channels used for retransmission (S119).

Note that, in the determination processing of Step S119, in addition to the NAV setting, whether or not it is in the BUSY state or the like can be included in the determination condition.

In a case where it is determined in the determination processing of Step S119 that the NAV has not been set, the processing proceeds to Step S120, and the processing of Steps S120 and S121 is performed.

That is, in the simulcast channel management unit 107, the frequency channel for which NAV is not set among the channels used for retransmission as the retransmission channel (S120). Furthermore, in the wireless communication module 15, by constructing the specified retransmission data or all pieces of data, a retransmission data frame for retransmission to the communication apparatus 10Rx on the receiving side is set (S121).

When the processing of Step S121 ends, or in a case where it is determined that the NAV is set in the determination processing of Step S119, the processing proceeds to Step S122.

Here, since the configuration is such that the reception operation of the ACK frame is performed on all frequency channels that can be simulcasted, in the determination processing of Step S122, it is determined whether or not the processing on all frequency channels has ended.

In a case where it is determined in the determination processing of Step S122 that the processing on all frequency channels has not ended, the processing returns to Step S113, the processing of Steps S113 to S122 are repeated, and a series of processing is performed according to the reception of the ACK frame for each ACK reception channel.

Note that, here, for convenience of explanation, a case where a series of processing according to the reception of the ACK frame is performed for each ACK reception channel has been described, but a series of processing in each ACK reception channel may be performed in parallel.

Then, when the retransmission timing is reached ("YES" in S123), the wireless communication module 15 transmits the retransmission data frame (S124). Note that, here, after the retransmission data frame is transmitted, the processing returns from Step S124 to Step S102 and repeats a series of processing.

The operation of the communication apparatus 10Tx on the data frame transmitting side has been described above.

(Operation on Data Receiving Side)

Next, the operation of the communication apparatus 10Rx (wireless communication module 15) on the data frame receiving side will be described with reference to the flowcharts of FIGS. 25 and 26. Note that, here, the case where the available channel information is described in the delimiter of the A-MPDU frame is illustrated as an example.

In the wireless communication module 15, waiting setting of the base channel for performing the transmission of the data frame is performed (S201). By this waiting setting of baseband, it is assumed that the connection with the communication apparatus 10Tx on the receiving side is secured by following a predetermined authentication procedure.

Here, in a case where, in the wireless communication module 15, a predetermined preamble signal has been detected ("YES" in S202), the processing of Steps S203 to S211 is performed.

That is, in a case where the data frame is an A-MPDU frame, if the predetermined delimiter has been acquired (S203) and has been normally received by the CRC at the end of the delimiter ("YES" in S204), the available channel information processing unit 109 acquires the available channel information included in the delimiter, that is, the information regarding (the status of) the simulcast channel (S205).

Furthermore, at this time, the simulcast channel reception processing (S206) is performed in each simulcast channel, and MPDU reception processing is performed up to the Length of the MPDU (S207). Note that the details of the simulcast channel reception processing will be described later with reference to the flowchart of FIG. 27.

Then, in the wireless communication module 15, in a case where the MPDU has been normally received ("YES" in S208), the received MPDU data is stored in the reception buffer 106 (S209), and the MPDU is stored as received (S210). Note that, in a case where it is determined in the determination processing of Step S208 that the MPDU cannot be normally received, the processing of Steps S209 and S210 are skipped, and the processing proceeds to Step S211.

Furthermore, in the wireless communication module 15, it is determined whether or not the end of the A-MPDU frame has been reached (S211), and the processing of Steps S203 to S211 are repeated until the end of the A-MPDU frame is reached. That is, here, the acquisition of the delimiter information and the reception of the MPDU are repeated until the end of the A-MPDU frame is reached.

On the other hand, in a case where it is determined in the determination processing of Step S211 that the end of the A-MPDU frame has been reached, the processing proceeds to Step S212, and the processing of Steps S212 and S213 is performed.

That is, in a case where the end of the A-MPDU frame is reached, in the wireless communication module 15, the latest received MPDU information (MPDU received information) is acquired (S212), and a block ACK frame is constructed on the basis of this MPDU received information (S213).

Here, in the wireless communication module 15, it is determined whether or not the ACK frame has a simulcast, that is, whether or not the SACK frame is set (S214).

In a case where it is determined in the determination processing of Step S214 that there is a simulcast, the processing proceeds to Step S215, and the processing of Steps S215 to S219 is performed.

That is, in the available channel information processing unit 109, information regarding (the status of) the simulcast channel available on the communication apparatus 10Tx on the transmitting side is acquired as the latest available channel information included in the delimiter (S215). Furthermore, in the simulcast channel management unit 107, information regarding (the status of) the simulcast channel available by the communication apparatus 10Rx on the receiving side is acquired (S216).

Therefore, in a case where the simulcast channel available on the transmitting side is compared with the simulcast channel available on the receiving side and the frequency channel is a channel on which the ACK frame can be transmitted ("YES" in S217), the frequency channel can be set as a simulcast channel of a block ACK frame (S218).

Note that, here, since the configuration can be made such that the transmission operation of the ACK frame is performed on all frequency channels that can be simulcasted, in the determination processing of Step S219, it is determined whether or not the processing on all frequency channels has ended.

In a case where it is determined in the determination processing of Step S219 that the processing on all frequency channels has not ended, the processing returns to Step S212, the processing of Steps S212 to S219 are repeated, and a series of processing is performed according to the transmission of the ACK frame for each simulcast channel.

Note that, here, for convenience of explanation, a case where a series of processing according to the transmission of the ACK frame is performed for each simulcast channel has been described, but a series of processing in each simulcast channel may be performed in parallel.

Furthermore, in a case where it is determined in the determination processing of Step S214 that there is no simulcast, the processing proceeds to Step S220. In this case, the base channel is set as the frequency channel for transmitting the block ACK frame (S220).

When the processing of Step S219 or S220 ends, the processing proceeds to Step S221. Then, when the retransmission timing is reached ("YES" in S221), the wireless communication module 15 transmits the block ACK frame (S222).

Note that, here, in a case where all MPDUs are received ("YES" in S223), a series of data reception processing ends, while, in a case where there are unreceived MPDUs ("NO" in S223), the processing returns to Step S202 and repeats a series of A-MPDU reception processing.

The operation of the communication apparatus 10Rx on the data frame receiving side has been described above.

(Flow of Simulcast Channel Reception Processing)

Next, the flow of the simulcast channel reception processing will be described with reference to the flowchart of FIG. 27.

Figure 23:
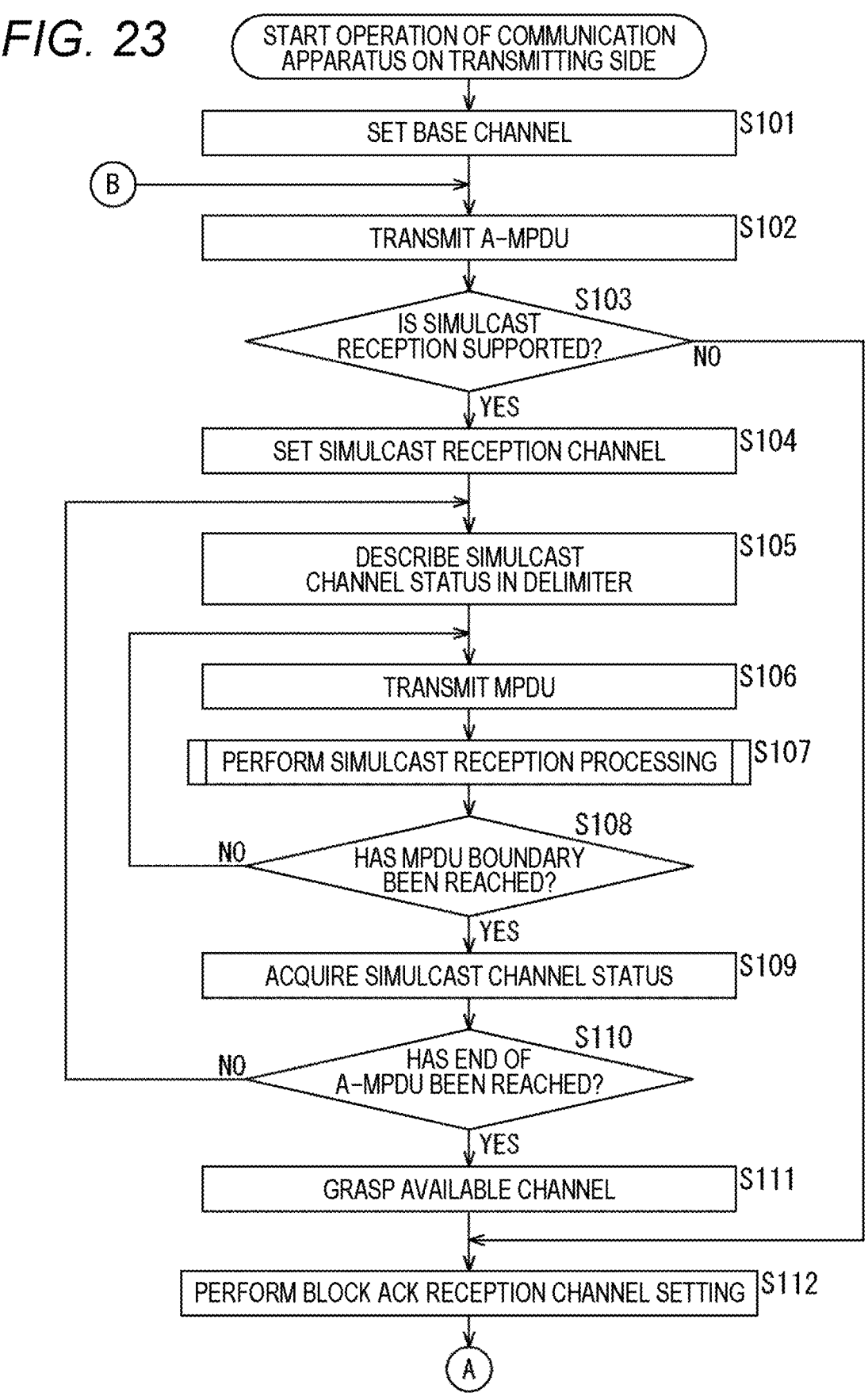
FIG. 23 is a flowchart for explaining operation of a communication apparatus on a data frame transmitting side.
Figure 25:
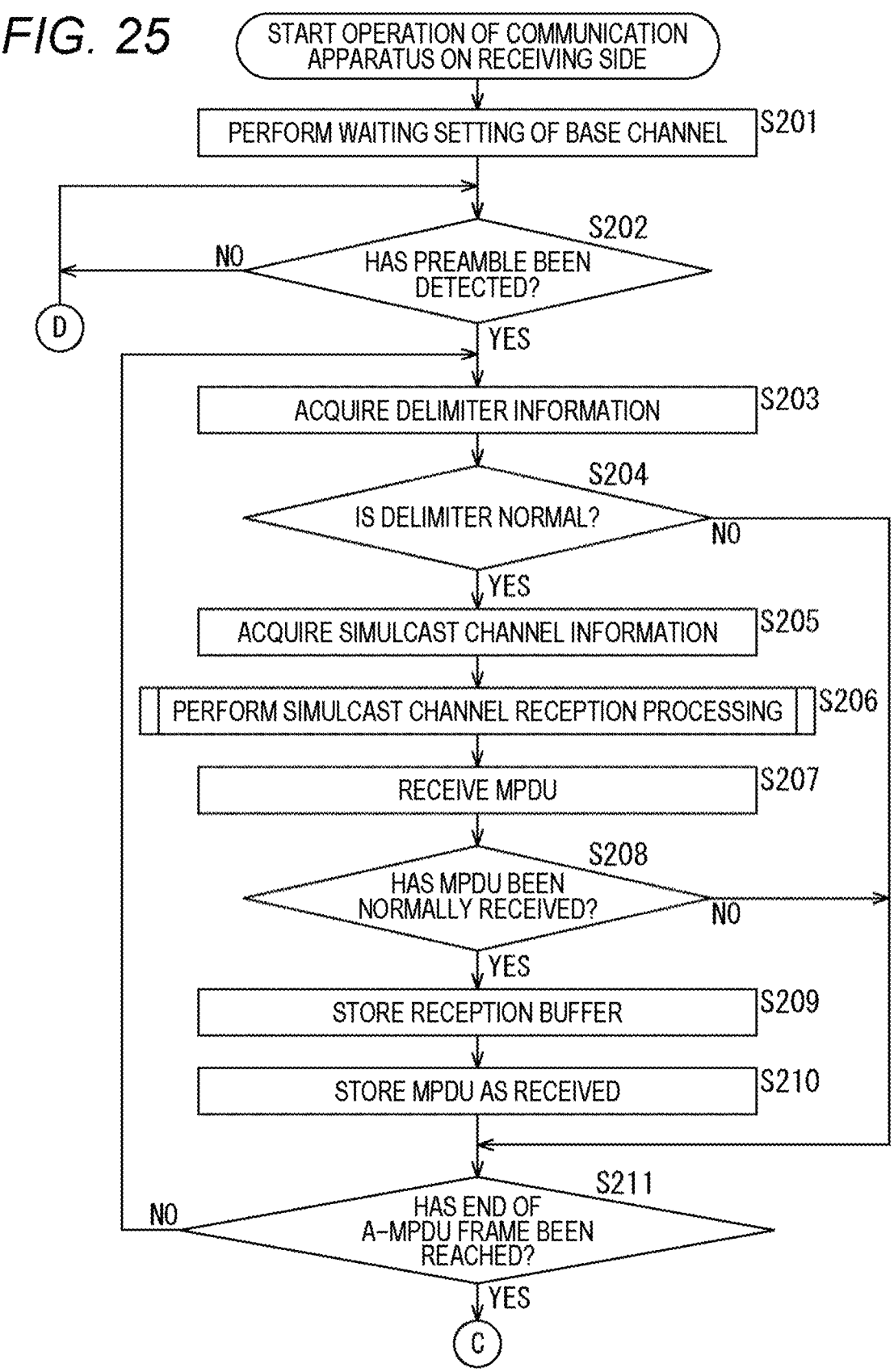
FIG. 25 is a flowchart for explaining operation of a communication apparatus on a data frame receiving side.
Figure 27:
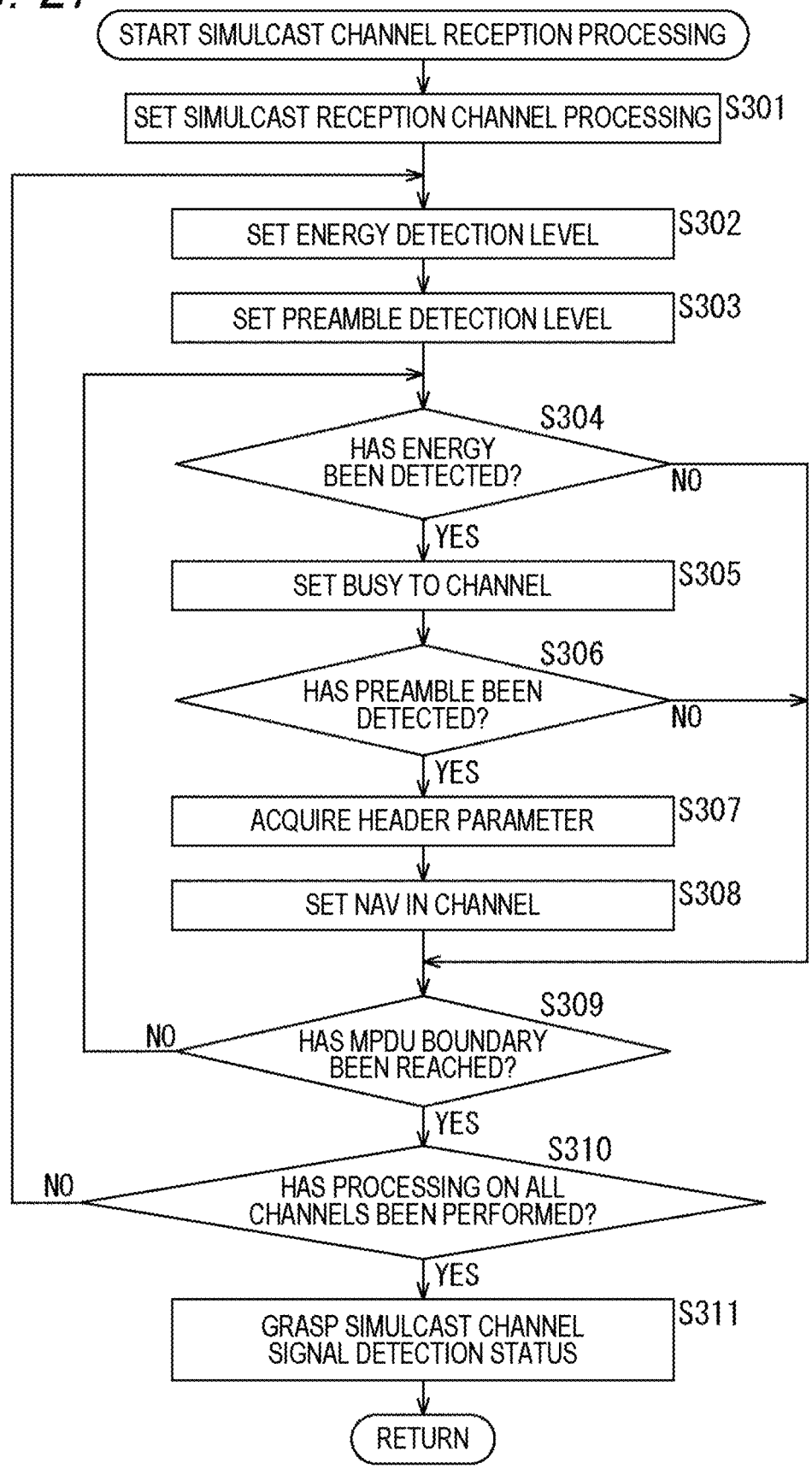
FIG. 27 is a flowchart for explaining a flow of simulcast reception processing.

That is, this simulcast channel reception processing is embodiment of the processing corresponding to the processing of Step S107 in FIG. 23 and the processing of Step S206 in FIG. 25, and may have a configuration in which the subroutine processing illustrated in FIG. 27 may be performed for each frequency channel in which the simulcast reception operation is set.

First, the simulcast channel management unit 107 sets the simulcast reception channel (S301). Therefore, a series of signal detection operations are performed. Here, as a received electric field strength, the detection level of the energy determined to detect the signal is set (S302), and the detection level of the preamble signal is set (S303).

When these settings are performed, the processing proceeds to Step S304, and the processing of Steps S302 to S309 is performed.

That is, in the wireless communication module 15, in a case where it is determined that the detection level of the predetermined energy is exceeded in the simulcast channel ("YES" in S304), it is determined that the frequency channel is in use, and the BUSY state is set to that frequency channel (S305).

Note that, the wireless communication module 15 is configured such that, in a case where the frequency channel in the BUSY state falls below the detection level of a predetermined energy, the BUSY state of the frequency channel is released.

Furthermore, here, the frequency channel in which the signal is detected is considered to be in use in a case where a signal having a predetermined received electric field strength or higher is detected in any of a plurality of monitored frequency channels (simulcast channels).

At this time, the set value of the reception electric field strength can be made variable according to the characteristics of the detected signal. Here, for example, in the communication apparatus 10Tx on the transmitting side, it is possible to set a lower set value for a signal addressed to the communication apparatus 10Tx on the transmitting side to make detection easier, while, it is possible to set a higher set value for a signal addressed to another adjacent communication apparatus to make detection harder.

Furthermore, in a case where it is determined that, in the wireless communication module 15, a predetermined preamble signal is detected ("YES" in S306), the parameter of the header information added after that is acquired (S307), and the network allocation vector (NAV) in the frequency channel is set (S308).

That is, here, in a case where a predetermined preamble signal is detected in any of a plurality of monitored frequency channels (simulcast channels), for example, time that the frequency channel on which the preamble signal has been detected is occupied is calculated on the basis of the parameters described in the header information acquired thereafter, and the frequency channel on which the preamble signal has been detected can be considered to be in use until the calculated time elapses.

In the wireless communication module 15, a series of detection processing of Steps S304 to S308 is repeated until it is determined that the boundary of the MPDU has been reached ("YES" in S309).

Note that, here, in a case where it is determined that the energy has not been detected in the determination processing of Step S304 ("NO" in S304), or in a case where it that the preamble signal has not been detected in the determination processing of Step S306 ("NO" in S306), subsequent processing is skipped and the processing proceeds to Step S309.

Furthermore, this simulcast channel detection operation is configured to be performed on all channels of the set simulcast reception channel (S310), and for convenience of explanation, described is a configuration where, in a case where the processing on all channels has not ended, the processing returns to Step S302 and the subsequent processing is repeated. Here, these series of processing may be processed in parallel for each simulcast channel.

Then, the operation has a configuration where, in a case where the processing of the simulcast channel detection operation has ended on all frequency channels ("YES" in S310), the signal detection status in the simulcast channel is grasped (S311).

When the processing of Step S311 ends, the processing returns to Step S107 of FIG. 23 or Step S206 of FIG. 25 and the subsequent processing is performed.

The flow of the simulcast channel reception processing has been described above. Note that, here, for convenience of explanation, a case where a series of reception processing is performed for each simulcast channel has been described, but a series of reception processing in each simulcast channel may be performed in parallel.

As described above, in the communication method (new method) to which the present technology is applied, the communication apparatus 10Tx on the data frame transmitting side monitors frequency channels other than the data frame transmission channel, and notifies the communication apparatus 10Rx on the receiving side of the available channel information by using the delimiter of the data frame to be transmitted or the like.

On the other hand, the communication apparatus 10Rx on the receiving side selects at least one or more frequency channels that are available by the communication apparatus 10Rx on the receiving side from among the available frequency channels included in the available channel information, and returns the block ACK frame. Furthermore, the communication apparatus 10Tx on the transmitting side can transmit the retransmission data frame by using the frequency channel on which the block ACK frame has been received.

As described above, in the new method, more reliable communication can be realized by including the available channel information regarding the frequency channel that is available for confirmation of receipt and retransmission in the data frame and the SACK frame.

That is, in the new method, it is possible to deliver the latest available channel information to the receiving side by using the delimiter inserted at the boundary of the subframe (MPDU) of the A-MPDU frame, and it is possible to notify the frequency channel that is available for returning the confirmation of receipt from the receiving side. Therefore, it is possible to exchange information with significantly improved reliability.

Furthermore, in the communication apparatus 10Rx on the receiving side, in a case where the A-MPDU frame cannot be correctly decoded from the middle due to interference, it is possible to grasp other available frequency channels from the information of the previous delimiter, so that it is possible to return the block ACK frame on these other frequency channels at the returning timing of the ACK frame.

Here, by returning the block ACK frame using the available frequency channel at such a timing, the confirmation of receipt can be returned to the transmitting side more reliably.

That is, as compared to the current method in which block ACK frames are exchanged using only one frequency channel as the current method, it is possible to use a frequency channel other than the frequency channel on which the A-MPDU frame has been transmitted, to return the block ACK frame, and therefore, it is possible to reliably exchange information of confirmation of receipt.

Furthermore, in the new method, it is possible to use the delimiter (information thereof) of the A-MPDU frame to sequentially notify information that is available for transmission. Therefore, it is possible to notify not only the status at the time of transmission of the A-MPDU frame but also the status during transmission of the A-MPDU frame.

Moreover, even in a case where it is difficult to return the ACK frame on the frequency channel due to interference from another system that transmits and receives data (signals) in other than the communication protocol used in the wireless LAN system, it is possible to use another frequency channel to reliably exchange ACK frames. Therefore, it is possible to efficiently operate the communication protocol of the wireless LAN system even in an environment where other systems coexist.

Furthermore, even in a case where the retransmission data is transmitted on the transmitting side, it is possible to provide a highly reliable communication method for more reliably delivering the retransmission data by performing retransmission using a frequency channel on which exchanging of block ACK frames has been clearly achieved. Moreover, by performing retransmission using a plurality of frequency channels available at that timing, undelivered data can be more reliably transmitted to the receiving side.

By reliably returning the block ACK frame as described above, it is possible to prevent retransmission of all pieces of data due to non-delivery of ACK, and only necessary data can be treated as retransmission data. As a result, the transmission path utilization efficiency can be greatly improved.

2. Modification

Example of Other Configurations

The communication apparatus 10Tx on the transmitting side described above can be configured as a base station (access point), and the communication apparatus 10Rx on the receiving side can be configured as a terminal station. However, the communication apparatus 10Tx or the communication apparatus 10Rx may be configured as a part (for example, a wireless communication module, a wireless chip, and the like) of a device included in the base station or the terminal station.

Furthermore, for example, the communication apparatus 10Rx on the receiving side configured as a terminal station may be configured as an electronic device having a wireless communication function such as, for example, a smartphone, a tablet terminal, a mobile phone, a personal computer, a digital camera, a game machine, a TV receiver, a wearable terminal, or a speaker device.

Note that, here, description has been made that the communication apparatus 10Tx on the transmitting side is the base station, and the communication apparatus 10Rx on the receiving side is the terminal station. However, by reversing the transmitting side and the receiving side, the base station may be the communication apparatus 10Rx on the receiving side, and the terminal station may be the communication apparatus 10Tx on the transmitting side.

Figure 24:
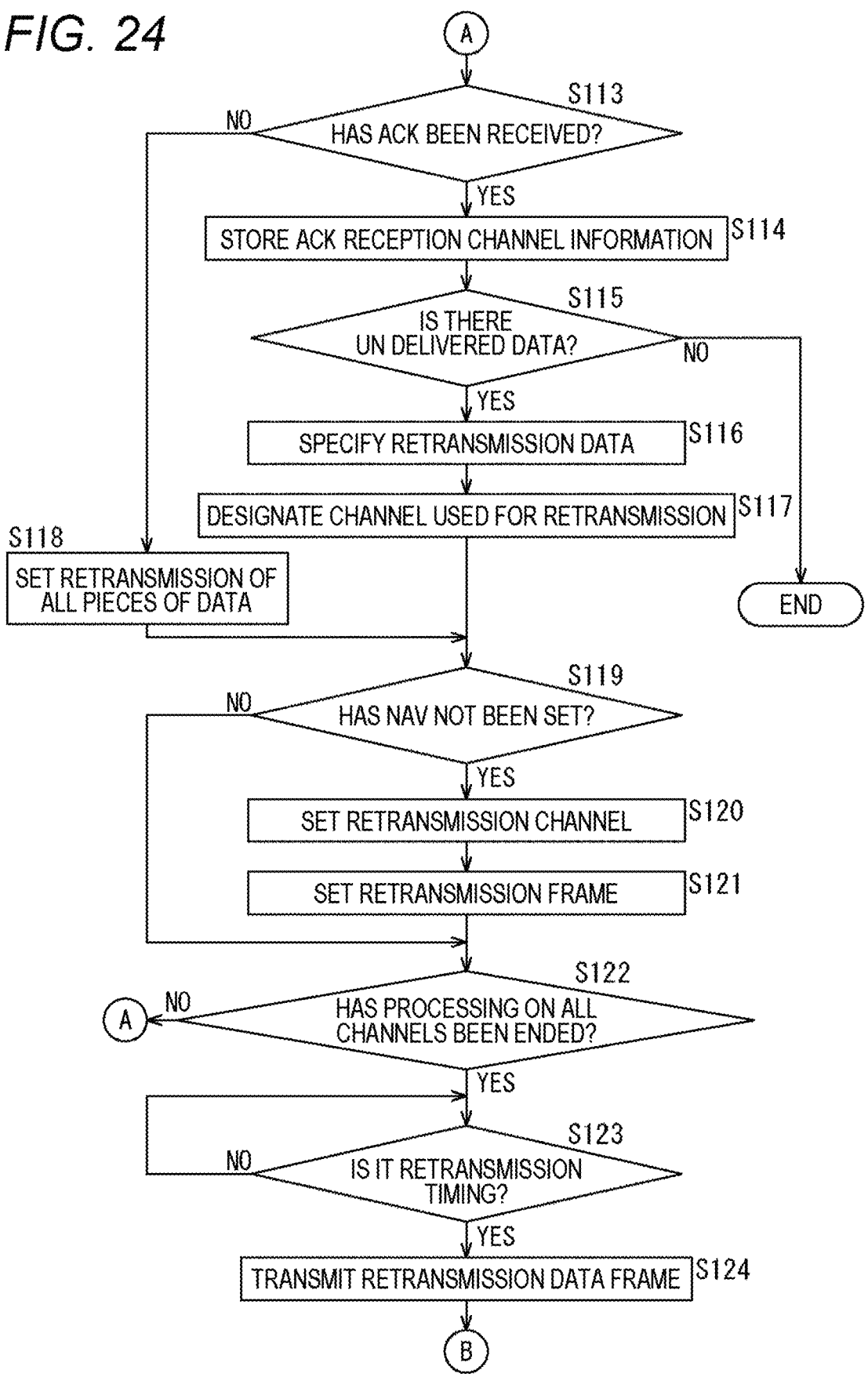
FIG. 24 is a flowchart for explaining operation of a communication apparatus on a data frame transmitting side.
Figure 26:
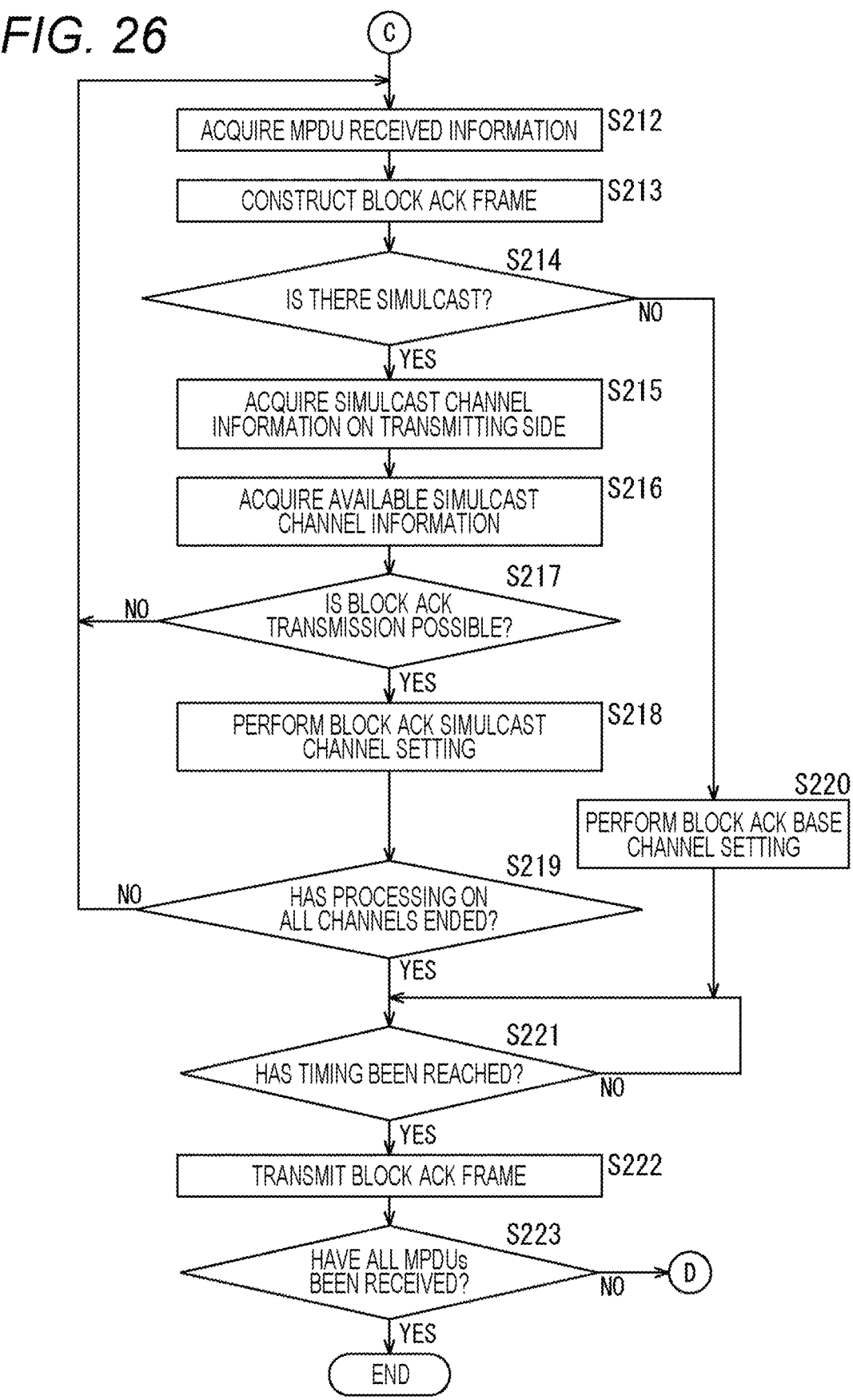
FIG. 26 is a flowchart for explaining operation of a communication apparatus on a data frame receiving side.

That is, the base station as the communication apparatus 10, of course, can perform operation on the data frame transmitting side illustrated in the flowcharts of FIGS. 23 and 24, but also can perform operation on the data frame receiving side illustrated in the flowcharts of FIGS. 25 and 26. As similar to this, the terminal station as the communication apparatus 10, of course, can perform operation on the data frame receiving side illustrated in the flowcharts of FIGS. 25 and 26, but also can perform operation on the data frame transmitting side illustrated in the flowcharts of FIGS. 23 and 24.

Note that the embodiments of the present technology are not limited to the above-described embodiments, and various modifications are possible without departing from the gist of the present technology.

Furthermore, the present technology can also adopt the following configuration.

(1)
A communication apparatus including
a control unit that performs control to
use an available frequency channel to transmit a data frame to another communication apparatus, and
add, to the data frame, available channel information regarding a frequency channel available for transmitting and receiving a frame.

(2)
The communication apparatus according to (1) described above,
in which the control unit
monitors a usage status of a frequency channel different from the frequency channel used for transmitting the data frame,
specifies an available frequency channel on the basis of monitoring results, and
includes the available channel information regarding the available frequency channel that has been specified, in the data frame.

(3)
The communication apparatus according to (1) or (2) described above,
in which the control unit controls operation of waiting for a confirmation signal used for confirmation of reception of the data frame as a signal transmitted from the another communication apparatus on the available frequency channel.

(4)
The communication apparatus according to (3) described above,
in which the confirmation signal includes specific information regarding data that needs to be retransmitted, and
the control unit
specifies the data on the basis of the specific information included in the confirmation signal, and
uses one or more frequency channels on which the confirmation signal has been received to transmit a data frame including the data that has been specified to the another communication apparatus.

(5)
The communication apparatus according to any one of (1) to (4) described above,
in which the data frame is configured as a frame in which a plurality of subframes is aggregated.

(6)
The communication apparatus according to (5) described above,
in which the control unit includes the available channel information in a delimiter of the data frame.

(7)
The communication apparatus according to (5) or (6) described above,
in which the control unit includes the available channel information in a header of the subframe.

(8)
The communication apparatus according to any one of (5) to (7) described above,
in which the control unit includes the available channel information as a management frame or an action frame.

(9)
The communication apparatus according to any one of (5) to (8) described above,
in which the control unit includes the available channel information in a preamble signal or a mid-amble signal.

(10)
A communication method including,
by a communication apparatus,
performing control to
use an available frequency channel to transmit a data frame to another communication apparatus, and
add, to the data frame, available channel information regarding a frequency channel available for transmitting and receiving a frame.

(11)
A communication apparatus including
a control unit that performs control to
use an available frequency channel to receive a data frame transmitted from another communication apparatus,
specify a frequency channel available for transmitting and receiving a frame on the basis of available channel information included in the data frame, and
use the frequency channel that is available and has been specified to transmit a confirmation signal used for confirmation of reception of the data frame to the another communication apparatus.

(12)
The communication apparatus according to (11) described above,
in which the control unit
monitors a usage status of a frequency channel different from the frequency channel used for receiving the data frame,
specifies an available frequency channel on the basis of monitoring results, and
includes available channel information regarding the available frequency channel that has been specified, in the confirmation signal.

(13)

The communication apparatus according to (11) or (12) described above,
in which the confirmation signal includes specification information regarding data that needs to be retransmitted, and
the control unit controls operation of waiting for a data frame including the data transmitted from the another communication apparatus on the available frequency channel.

(14)

The communication apparatus according to (13) described above,
in which the control unit uses one or more frequency channels on which the data frame has been received, to transmit a confirmation signal used for confirmation of reception of the data frame to the another communication apparatus.

(15)

The communication apparatus according to any one of (11) to (14) described above,
in which the data frame is configured as a frame in which a plurality of subframes is aggregated.

(16)

The communication apparatus according to (15) described above,
in which the control unit acquires the available channel information included in a delimiter of the data frame.

(17)

The communication apparatus according to (15) or (16) described above,
in which the control unit acquires the available channel information included in a header of the subframe.

(18)

The communication apparatus according to any one of (15) to (17) described above,
in which the control unit acquires the available channel information included as a management frame or an action frame.

(19)

The communication apparatus according to any one of (15) to (18) described above,
in which the control unit acquires the available channel information included in a preamble signal or a midamble signal.

(20)

A communication method including,
by a communication apparatus,
performing control to
use an available frequency channel to receive a data frame transmitted from another communication apparatus,
specify a frequency channel available for transmitting and receiving a frame on the basis of available channel information included in the data frame, and
use the frequency channel that is available and has been specified to transmit a confirmation signal used for confirmation of reception of the data frame to the another communication apparatus.

REFERENCE SIGNS LIST 10, 10Tx, 10Rx Communication apparatus
11 Internet connection module
12 Information input module
13 Device control unit
14 Information output module
15 Wireless communication module
101 Interface
102 Transmission buffer
103 Network management unit
104 Transmission frame construction unit
105 Received data construction unit
106 Reception buffer
107 Simulcast channel management unit
108 Available channel information generation unit
109 Available channel information processing unit
110 Transmission power control unit
111 Base channel transmission processing unit
112 Simulcast transmission processing unit
113 Frequency channel control unit
114 Base channel reception processing unit
115 Simulcast reception processing unit
116 Detection threshold control unit
117 Antenna control unit
151 Transmission and received data input and output unit
152 Control unit
153 Wireless signal transmission and reception unit

The invention claimed is:

1. A communication apparatus comprising
a circuit that performs control to
use an available frequency channel to transmit a data frame to another communication apparatus, the data frame being in the form of an A-MPDU frame including MAC protocol data units (MPDUs), and
add, to the data frame, delimiters between the MPDUs, each delimiter including available channel information regarding a frequency channel available for transmitting and receiving a frame,
wherein the delimiters are sent in between the MPDUs at different time points,
in response to the A-MPDU frame being transmitted, the circuit transmits a simulcast block ACK (SACK) frame using one or more frequency channels that are available, and
wherein in response to data within the A-MPDU frame not being received by the another communication apparatus, the circuit retransmits the data using the one or more frequency channels on which the SACK frame has been sent.

2. The communication apparatus according to claim 1, wherein the circuit
monitors a usage status of a frequency channel different from the frequency channel used for transmitting the data frame,
specifies an available frequency channel on a basis of monitoring results, and
includes the available channel information regarding the available frequency channel that has been specified, in the data frame.

3. The communication apparatus according to claim 1, wherein the circuit controls operation of waiting for a confirmation signal used for confirmation of reception of the data frame as a signal transmitted from the another communication apparatus on the available frequency channel.

4. The communication apparatus according to claim 3, wherein the confirmation signal includes specific information regarding data that needs to be retransmitted, and
the circuit
specifies the data on a basis of the specific information included in the confirmation signal, and
uses one or more frequency channels on which the confirmation signal has been received to transmit a data frame including the data that has been specified to the another communication apparatus.

5. A communication method comprising,
by a communication apparatus,
performing control to
use an available frequency channel to transmit a data frame to another communication apparatus, the data frame being in the form of an A-MPDU frame including MAC protocol data units (MPDUs), and
add, to the data frame, delimiters between the MPDUs, each delimiter including available channel information regarding a frequency channel available for transmitting and receiving a frame,
wherein the delimiters are sent in between the MPDUs at different time points, and
wherein the method further comprises:
in response to the A-MPDU frame being transmitted, the circuit transmits a simulcast block ACK (SACK) frame using one or more frequency channels that are available, and
in response to data within the A-MPDU frame not being received by the another communication apparatus, the circuit retransmits the data using the one or more frequency channels on which the SACK frame has been sent.

* * * * *